United States Patent [19]

Osanai

[11] 4,318,138
[45] Mar. 2, 1982

[54] AUTOMATIC REVERSE CASSETTE TAPE RECORDER WITH A ROTATABLE HEAD-SUPPORTING BOARD

[75] Inventor: Akira Osanai, Hachioji, Japan

[73] Assignee: Olympus Optical Co., Ltd., Tokyo, Japan

[21] Appl. No.: 94,930

[22] Filed: Nov. 16, 1979

[30] Foreign Application Priority Data

Nov. 16, 1978 [JP] Japan .................. 53-141617
Nov. 16, 1979 [JP] Japan ............... 53-157808[U]

[51] Int. Cl.³ .................. G11B 15/18; G11B 19/02
[52] U.S. Cl. ........................ 360/69; 360/723; 360/74.1; 360/96.6; 360/105
[58] Field of Search .......... 360/69, 74.1–74.2, 360/75, 723, 96.1–96.2, 96.3–96.6, 105, 121, 78; 242/191–200

[56] References Cited

U.S. PATENT DOCUMENTS 3,571,524 3/1971 Kozu et al. ............... 360/69
3,810,241 5/1974 Murata .................. 360/96.4

OTHER PUBLICATIONS

IBM/TDB, vol. 20, No. 2, Jul. 1977, pp. 706-707, "Magnetic Head Advance and Retraction Mechanism" by Kirkseg.

Primary Examiner—John H. Wolff

[57] ABSTRACT

A capstan shaft is disposed in the center, and 4-track 2-channel heads are arranged on a single rotatable head-supporting board in positions at equal distances from the rotation center of the head-supporting board. At time of tape end detection or programming (manual reverse), the head-supporting board is rotated to extrude and retract the heads on the upper- and lower-course sides of the center capstan, respectively, so that only the upper-course-side head may be brought into contact with a tape face. Naturally, in such construction, there is no need of 4-channel heads, and steady tape run can be obtained because the upper-course-side head is always in contact with the tape face in both forward and reverse operations.

13 Claims, 35 Drawing Figures

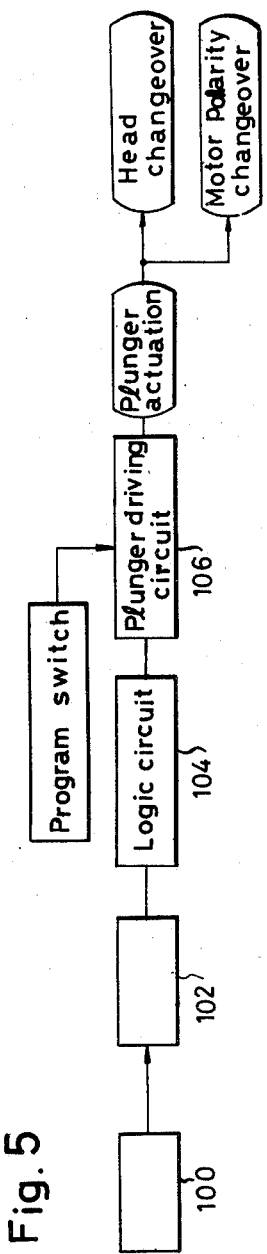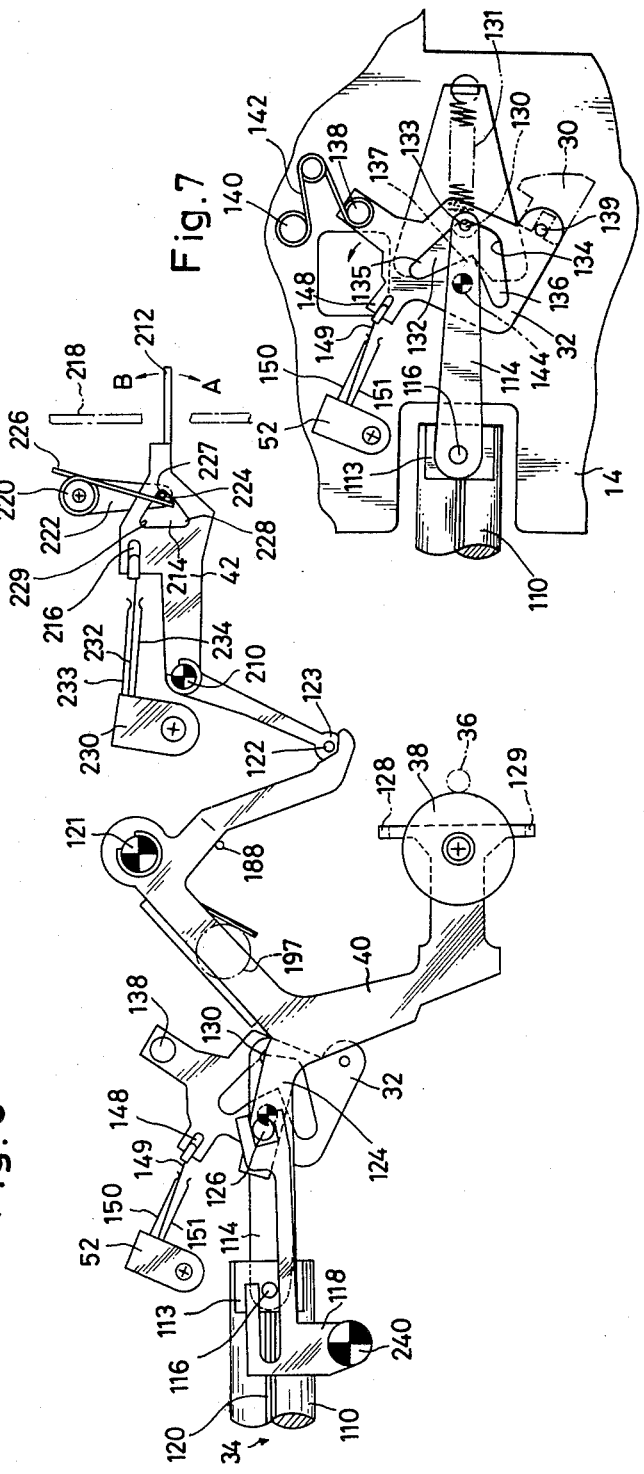

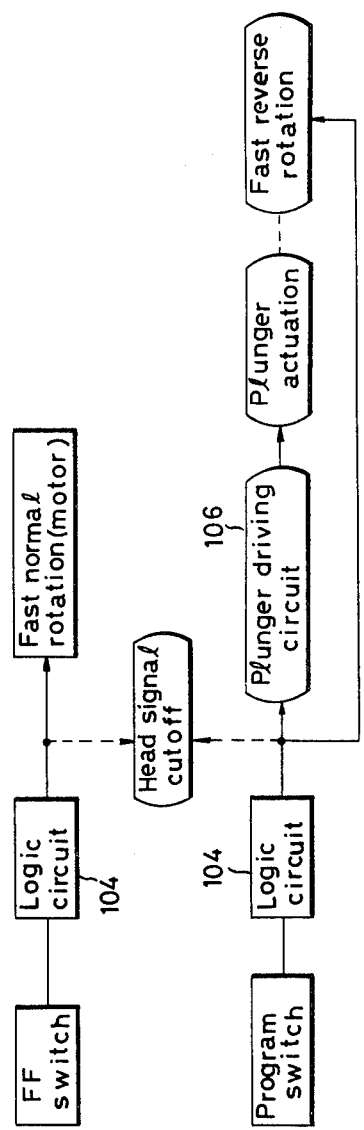

AUTOMATIC REVERSE CASSETTE TAPE RECORDER WITH A ROTATABLE HEAD-SUPPORTING BOARD

BACKGROUND OF THE INVENTION

This invention relates to an automatic reverse tape recorder, more particularly to an automatic reverse cassette tape recorder using cassette tapes.

Conventionally known are automatic reverse cassette tape recorders for use with car stereos which can perform the reproduction in both forward and reverse directions with use of compact cassettes. This conventional automatic reverse cassette tape recorders generally employ a side capstan system in which a plurality of magnetic heads are arranged in the center and capstan shafts are disposed on both sides of the magnetic heads, respectively. Stereo-system cassette tape recorders such as car stereos include 4-channel magnetic heads. However, the conventional microcassette tape recorders generally adopt a center capstan system in which a capstan shaft is disposed in the center, and are unsuitable for automatic reverse. Hereupon, the side capstan system may be applied also to the microcassette tape recorders. In this case, 4-channel heads are needed for the performance of stereo operations. However, it is hard to manufacture 4-channel heads that can be utilized for the microcassette tape recorders in consideration of their size.

SUMMARY OF THE INVENTION

It is therefore an object of this invention to provide an automatic reverse cassette tape recorder capable of stereo operations with use of the center capstan system without employing 4-channel heads, as well as of steady tape run.

To attain the above-mentioned object, according to this invention, a capstan shaft is disposed in the center, and 4-track 2-channel magnetic heads are arranged on a single rotatable head-supporting board in positions at equal distances from the rotation center of the head-supporting board. At time of tape end detection or programming (manual reverse), the head-supporting board is rotated to extrude and retract the heads on the upper- and lower-course sides of the center capstan shaft, respectively, so that only the upper-course-side head may be extruded to bring into contact with a tape face.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWING

FIG. 5 is a block circuit diagram indicating the action of a magnetism-sensitive element;

FIG. 6 is a top plan view showing the mechanical relationship of a plunger, cam board, pinch roller-supporting board and tape fast forward (hereinafter abbreviated as "FF") lever;

FIG. 7 is a top plan view indicating the action of the cam board;

FIG. 30 is a block circuit diagram showing the action of an FF switch and a program switch.

DETAILED DESCRIPTION OF THE PREFERRED EMBODIMENT

There will now be described by reference to the accompanying drawing an automatic reverse cassette tape recorder embodying this invention.

Figure 1:
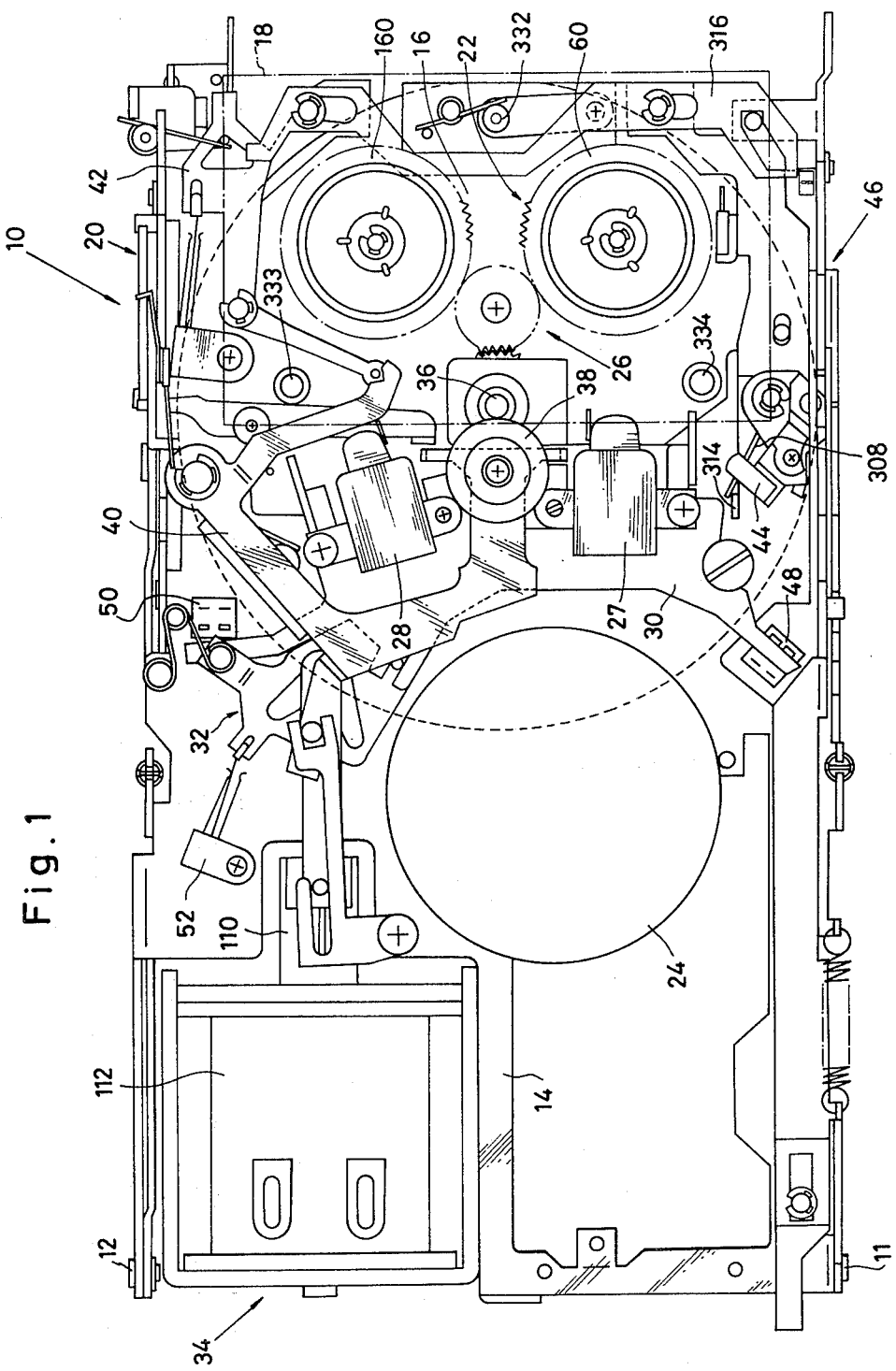
FIG. 1 is a plan view of an automatic reverse cassette tape recorder embodying this invention, with a case taken off.

Referring to FIG. 1, an automatic reverse cassette tape recorder of this invention comprises a movable chassis 16 rotatably fitted to a fixed chassis 14 by means of a pair of rotation pins 11, 12. As in the Staar system, the movable chassis 16 rises upward in a rotated state when a locking mechanism 20 is released by the insertion of a cassette 18. When the movable chassis 16 rises, the cassette 18 is supported on a reel mechanism 22. A rotation torque is transmitted from a motor 24 to the reel mechanism 22 by means of a motive power-transmitting mechanism 26. A head-supporting board 30 carrying a pair of recording-reproduction heads 27, 28 is rotatably fitted to the fixed chassis 14. There paired recording-reproduction heads 27, 28 may be each of the 4-track 2-channel type and are spaced from the rotation center of a head-supporting board 30 at the same distance. A rotatable cam board 32 designed to rotate the head-supporting board 30 for the alternate push of the paired recording-reproduction heads and a plunger mechanism 34 are also mounted on the fixed chassis 14. A rotatable pinch roller-supporting board 40 is also mounted on the fixed chassis 14 at a point above the head-supporting board 30. This pinch roller-supporting board 40 is provided at one end with a pinch roller 38 for clamping a tape with the aid of a capstan shaft 36 set on the movable chassis 16. A tape FF lever 42 is also provided on the fixed chassis 14. When the pinch roller-supporting board 40 is rotated to retract the pinch roller 38, then the tape FF lever 42 effect the quick run of a cassette tape. An erase head 44 is retractively set on the fixed chassis 14, which is also fitted with an erase head changeover mechanism 46 for controlling the forward and backward movements of the erase head 44. In addition to the above-mentioned mechanical parts, a head circuit changeover switch 48 and motor polarity changeover switch 50 are mounted on a printed circuit board (not shown) disposed below the fixed chassis 14. Further, a tape running direction-instructing switch 52 is mounted on the fixed chassis 14. There will now be described the constituent parts of the aforesaid various mechanisms and other mechanisms.

Now, viewed from the direction in which the cassette is inserted into the tape recorder, that is, the right side of FIG. 1, the direction in which a tape is run from the left to the right is referred to as "a forward direction". The opposite direction in which the tape travels from the right to the left is referred to as "a reverse direction".

As apparent from FIG. 1, the reel mechanism 22 comprises a pair of reel rests 60, 160, which obviously act as a tape feed or a tape takeup member alternately in accordance with the direction in which the motor is driven. Description is now given of the reel rest 60 acting, for example, as a tape feed member at the time of the forward run of a tape.

Figure 2:
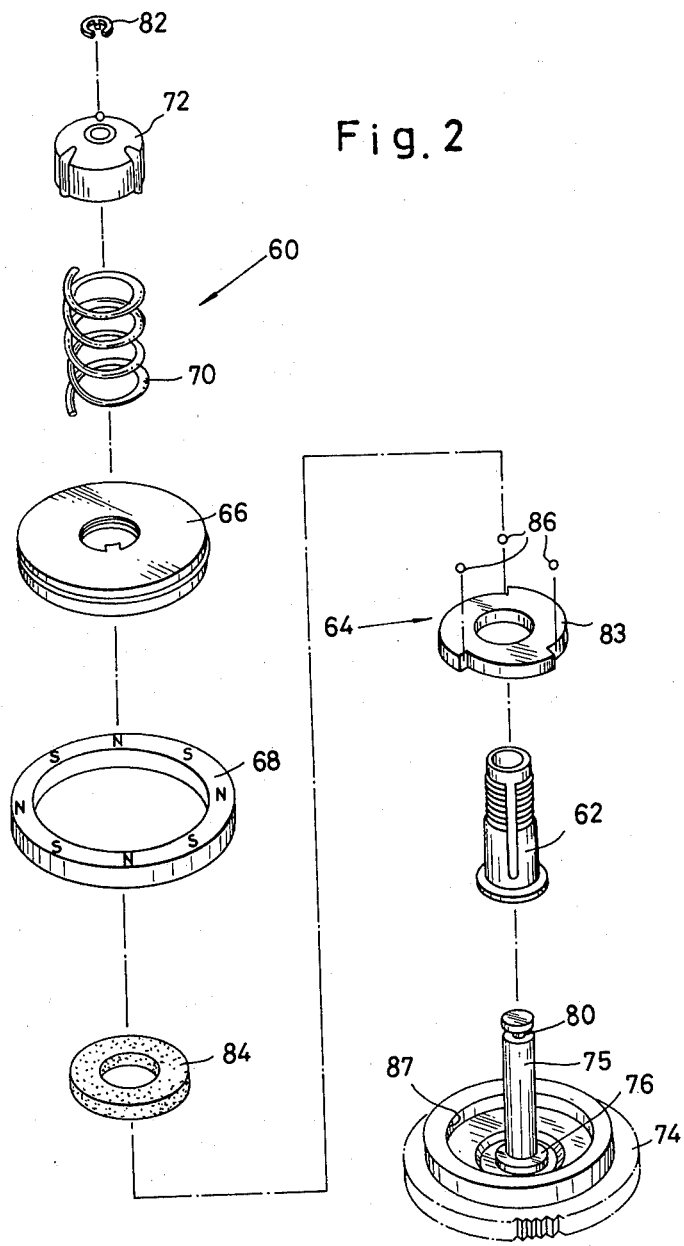
FIG. 2 is an exploded perspective view of a reel rest.
Figure 3:
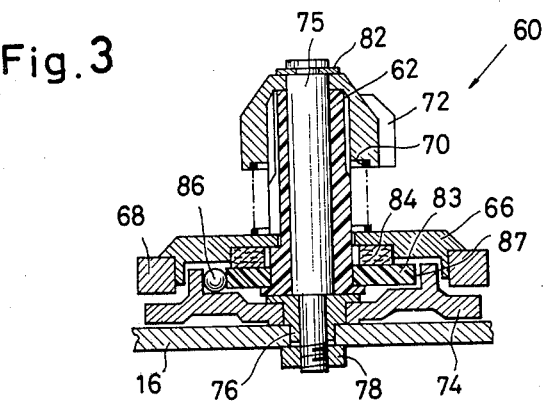
FIG. 3 is a longitudinal sectional view of an assembled reel rest.

As seen from FIGS. 2 and 3, the reel rest 60 comprises a threaded and flanged reel shaft 62 provided with an axially extending slit, and a reel base 66 having a key (not shown) engageable with said slit, and fitted to the reel shaft 62 by means of one-way clutch mechanism 64. A magnetic ring 68 provided with a plurality of alternately arranged N and S poles is fitted around the peripheral wall of the reel base 66. A drive pawl 72 is threadedly engaged with the external or male thread portion of the reel shaft 62 by means of a compression spring 70. The reel shaft 62 is loosely fitted around the peripheral wall of a gear shaft 75 of a reel gear 74 constituting part of the later described motive power-transmitting mechanism 26. The reel gear 74 is securely fitted to the gear shaft 75 by means of a collar 76. A nut 78 (FIG. 3) is threadedly engaged with the male thread portion of the lower end section of the gear shaft 75 to fix the reel rest 60 to the movable chassis 16. A snap ring 82 is fitted into an annular groove 80 (FIG. 2) formed in the peripheral wall of the free end of the gear shaft 75 to fix the reel base 66 to the reel shaft 62.

The one-way clutch mechanism 64 comprises a clutch plate 83, in the peripheral edge of which three spiral notches are cut out equiangularly, a felt plate 84 disposed between the clutch plate 83 and reel base 66, and three steel balls 86 (FIG. 2) received in the respective spiral notches of the clutch plate 83. The steel balls are chosen to have such a dimension as can be loosely moved through a free space defined between the inner peripheral wall 87 of the reel gear 74 and the spiral notches of the clutch plate 83.

Figure 4:
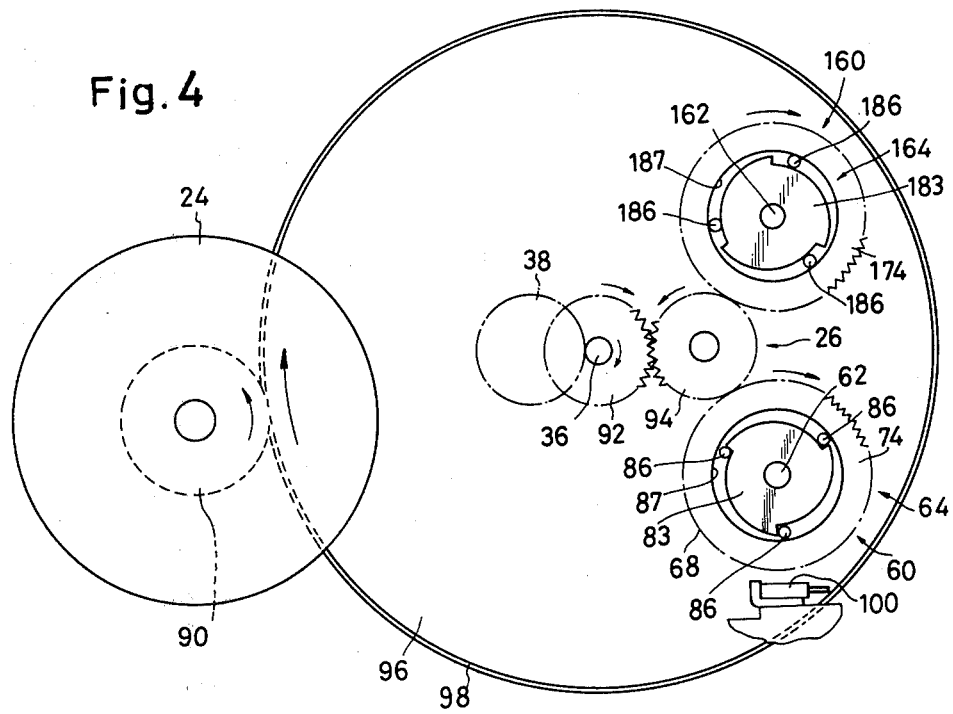
FIG. 4 is a schematical top plan view showing the mechanical relationship of a power transmitting mechanism and one-way clutch mechanism.

As shown in FIG. 4, the reel rest 160 acting as a tape takeup member in the above-mentioned case has the same construction as the aforesaid tape feed reel rest 60, except that the spiral notches of the clutch plate 83 are extended in the opposite direction to those of said tape feed reel rest 60, and the magnetic ring 68 is omitted. The constituent parts of the tape takeup reel rest 160 are denoted by reference numerals formed by adding a number of 100 to the reference numerals representing the corresponding constituent parts of the tape feed reel rest 60.

With the automatic reverse cassette tape recorder of this invention, the rotation torque of the motor 24 is transmitted by means of a motor pulley 90 (FIG. 4) to the capstan 36 and reel shafts 62, 162 through the motive power-transmitting mechanism 26 consisting of a series of gears, without passing through an idler lever, etc. as is the case with the prior art automatic reverse tape recorder. As shown in FIG. 4, the motive power-transmitting mechanism 26 comprises a capstan gear 92 fitted to the capstan shaft 36, a pair of reel gears 74, 174 respectively fitted to the reel shafts 62, 162, and an intermediate gear 94 positioned between the capstan gear 92 on one hand and reel gears 74, 174 on the other. The rotation torque of the motor 24 is transmitted by means of the motor pulley 90 to the capstan 36 through a flywheel 96 and thence to the reel gears 74, 174 through the capstan gear 92 and intermediate gear 94. The rim of the flywheel 96 is fitted with a rubber tire 98.

When the motor pulley 90 of the motor 24 is rotated counterclockwise of FIG. 4, then the capstan 36 and reel gears 74, 174 are all rotated clockwise. Where, with the tape feed reel rest 60, the reel gear 74 is rotated clockwise, then the steel balls 86 run away toward a larger space due to the contact with the inner peripheral wall 87 of the reel gear 74 and are rotated idly between the inner peripheral wall 87 and clutch plate 83, giving rise no friction therebetween. As a result, the clutch plate 83 and consequently the reel base 66 and reel shaft 62 are not obviously rotated. Conversely with the tape takeup reel 160, the steel balls 186 tightly contact the inner peripheral wall 187 of the reel gear 174 and are moved toward a small space to perform a wedging action. Since, at this time, a frictional force appears between the inner peripheral wall 187 of the reel gear 174 and the clutch plate 183, the steel balls 186 causes the clutch plate 183 to be rotated clockwise. The rotation of the clutch plate 183 leads to the rotation of the reel base 166 by means of the felt plate 184. As a result, the reel rest 160 takes up a tape.

Where the motor pulley 90 is rotated clockwise (not shown), then the clutch plate 83, felt plate 84, and reel base 66 are rotated by the reverse operation from that described above, causing the reel rest 60 to take up a tape.

As mentioned above, the motive power-transmitting mechanism 26 comprises the capstan gear 92, intermediate gear 94, and reel gears 74, 174. Even where the reel gears 74, 174 corresponding to the tape takeup reel rest 60 and tape feed reel rest 160 are rotated at the same time, the one-way clutch mechanism 64, 164 allow only the reel rest 60 or 160 acting as a tape takeup member to be rotated. Where, therefore, the rotating direction of the single motor 24 is reversed, the forward or reverse run of a tape can be easily ensured.

The rotation of the motor 24 is reversed at the detection of a tape end and further as often as required. A magnetism-sensitive element 100 is provided, as shown in FIGS. 1 and 4, adjacent to the magnetic ring 68. The magnetism-sensitive element 100 and the magnetic ring 68 constitute tape end detecting means. This magnetism-sensitive element 100 causes either of the paired recording-reproduction heads to be pushed when the reversion of the run of the motor 24 is detected. To described in greater detail, the magnetism-sensitive element 100 detects changes in the waveform of pulses issued from the pulse-generating magnetic ring 68 provided with a plurality of alternately arranged N and S poles, and produces an output signal. This output signal is successively processed, as shown in FIG. 5, by a signal-processing circuit 102, logic circuit 104, and plunger driving circuit 106 in the order mentioned, eventually actuating the plunger mechanism. As a result, the head-supporting board 30 is rotated, causing either of the paired recording-reproduction heads to be pushed alternately. The pulse-generating magnetic ring 68 for issuing pulses to the magnetism-sensitive element 100 is fitted to the peripheral wall of the reel body 64. However, the motor pulley 90 may be concurrently used as a magnetic ring. This arrangement reduces a number of parts required and facilitates the assembly of the whole automatic reverse tape recorder. In such case the magnetism-sensitive element 100 should obviously be set adjacent to the motor pulley 90.

As seen from FIGS. 1 and 6, the plunger mechanism 34 comprises a plunger 110 and plunger body 112 which is connected to a plunger-driving circuit 106 and through which a plunger reciprocates. The free end of the plunger 110 has a flat upper surface 113, which is fitted with one end of a coupling board 114 for transmitting the reciprocation of the plunger 110 to a cam board 32 for rotating a head-supporting board 30. To describe in greater detail, a pin 116 erected at one end of the coupling board 114 extends through a hole formed in the flat surface 113 of the plunger 110. The coupling board 114 is fitted to the plunger 110 by means of a snap ring (not shown). The pin 116 passes upward through the coupling board 114. A plunger arm 118 having a long groove which is disposed above the coupling board 114 and allows for the reciprocation of the pin 116 is movably mounted on the fixed chassis 14 adjacently to the plunger 110. A guide groove 120 having a triangular cross section is formed in the surface of the plunger 110 to guide its reciprocation in a state prevented from being rotated.

As apparent from FIG. 6, a pinch roller-supporting board 40 is disposed between the plunger arm 118 and coupling board 114. The pinch roller-supporting board 40 is mounted on the fixed chassis 14 by causing the upward extending integral collar of the supporting board 40 to be loosely fitted around a shaft 121 erected on the fixed chassis 14 and also fitting a snap ring to the shaft 121. A torsion coil spring 188 is fitted around the shaft 121 to impart a counter-clockwise urging force to the pinch roller-supporting board 40. One end of the torsion coil spring 188 is pressed against the lateral face of the later described eccentric pin 197. The pinch roller 38 is rotatably fitted to one end of the pinch roller-supporting board 40, the other end of which is provided with a notch 123, against which the pin 122 of the tape FF lever 42 is pressed. A projecting attachment 124 is mounted on the pinch roller-supporting board 40 between the cam board 32 and plunger arm 118. Erected on the upper surface of the projecting attachment 124 is a pin 126 fitted into a groove formed in the 2-pronged free end of the plunger arm 118. As seen from FIG. 6, the pinch roller-supporting board 40 holding the pinch roller 38 has one end shaped like the letter T, both ends of whose bar are constituted by downward bent portions 128, 129.

To avoid the complication of the drawing, the shaft and pin acting as a rotation center are particularly marked with the symbol  in other drawings than FIG. 1.

As apparent from FIG. 7, a downward extending pin 130 is erected at the other end of the coupling board 114. A tension coil spring 131 is stretched between the pin 130 and fixed chassis 14. This tension coil spring 131 presses the pin 130 against the lateral wall of the heart-shaped cam groove 132 of the cam board 32. The heart-shaped cam groove 132 comprises a pair of lobes 135, 136 and a pair of corners 133, 134. Both lobes 135, 136 jointly define a V-shaped junction 137. Where a tape is run in the forward direction and the recording-reproduction head 27 is pushed, the pin 130 is pressed against the lobe 133.

A larger pin 138 and smaller pin 139 project from the upper surface of the cam board 32. A torsion coil spring 142 acting as a toggle spring is stretched between the larger pin 138 and a pin 140 erected on the fixed chassis 14. The cam board 32 is rotatably fitted to the fixed chassis 14 by means of a rotating pin 144. In the condition indicated in FIG. 7, the junction 137 of the paired lobes 135, 136 is set below an imaginary line extended between the pin 144 acting as a rotation center and the pin 130. The cam board 32 comprises an integrally formed 2-prong projecting attachment 148. A movable contact 149 of a tape run direction-instructing switch 52 is fitted into a long groove of the projecting attachment 148. The switch 52 comprises a pair of fixed contacts 150, 151 with a movable contact 149 set therebetween. A connection between the movable contact 149 and either of the paired fixed contacts 150, 151 closes the tape run direction-instructing circuit, causing either of a pair of lamps (not shown) indicating the forward and backward runs of a tape to be lighted.

Figure 8:
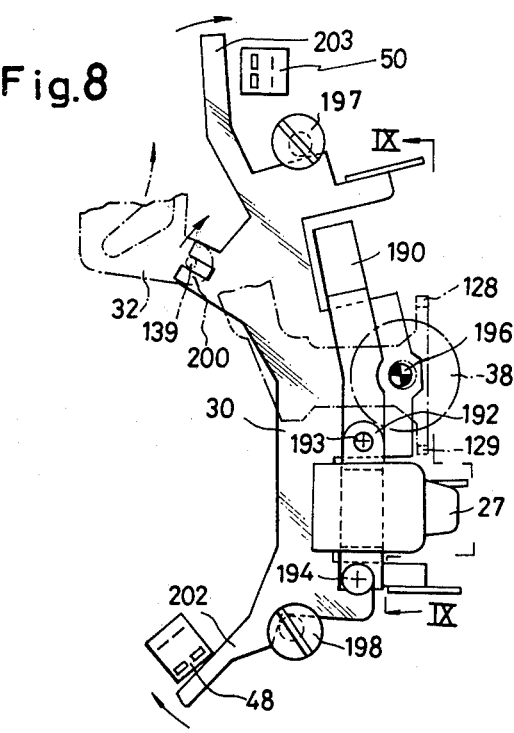
FIG. 8 is a top plan view showing the action of a head-supporting board.
Figure 9:
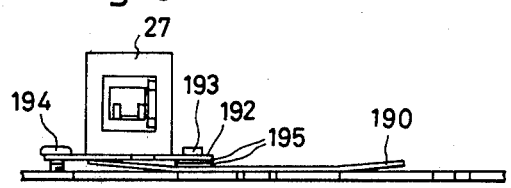
FIG. 9 is a fractional front view on line IX—IX of FIG. 8 of the head-supporting board.

The head-supporting board 30 rotated by the cam board 32 comprises, as shown in FIGS. 8 and 9, an adjustment leaf spring 190, both ends of which are turned slighted upward. The recording-reproduction heads 27, 28 (only 27 is indicated to avoid the complication of representation) are set above both upturned ends of the adjustment leaf spring 190. The recording-reproduction head 27 is set in place by mounting a fitting board 192 attached to the underside of the recording-reproduction head 27 on one of both upturned ends of the adjustment leaf spring 190, and fitting both ends of the fitting board 192 to the head-supporting board 30 by means of screws 193, 194. The inclination and displacement of the recording-reproduction head 27 are prevented by holding two washers 195 to define the level at which the recording-reproduction head 27 is to be fixed and controlling the threaded engagement of the other screw 194. The leaf spring 190 slightly turned upward at both ends enables the azimuth of the recording-reproduction head to be adjusted easily and over a board range.

Figure 11:
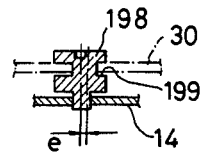
FIG. 11 is a sectional view on line XI—XI of FIG. 10.
Figure 10:
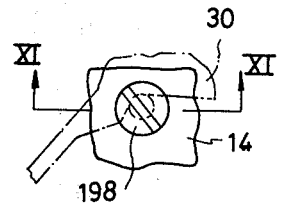
FIG. 10 is a top plan view indicating the mechanical relationship of an eccentric pin and the head-supporting board.

The head-supporting board 30 is fitted to the fixed chassis 14 by means of a screw 196 in a state rotatable about the screw 196. A pair of locating eccentric pins 197, 198 are equidistantly arranged on both sides of the rotatable screw 196 to adjust the position of the recording-reproduction head when pushed at the rotation of the head-supporting board 30. As shown in FIGS. 10 and 11, the eccentric pin 198 has its upper surface provided with a slot and its lower portion formed into a male-threaded screw. The slotted surface and male-threaded lower portion are concentrically arranged. An annular groove 199 is formed at the central part of the eccentric pin 198, with the peripheral wall of the groove 199 pressed against the lateral side of the head-supporting board 30. The center line of the eccentric pin 198 is displaced from that of the annular groove 199 for a distance e. Since, as mentioned above, the annular groove 199 is displaced from the male-threaded lower portion of the eccentric pin 198 fitted to the fixed chassis 14, the rotation of the slotted surface of the eccentric pin 198 causes that plane of the eccentric pin 198 which abuts against the head-supporting board 30 to be widely displaced, though the eccentric pin 198 itself remains unchanged in position. Accordingly, the horizontally pushed position of the recording-reproduction head 27 or 28 can be reliably adjusted over a broad range without increasing a free space occupied by the eccentric pin 198. Since the head-supporting board 30 is located in a position spaced from the center 196 by the engagement with the annular groove 199 on the eccentric pin 198, the position of the head-supporting board 30 after rotating may be maintained with accuracy, and the contact surfaces of the head and tape can be held in a predetermined position. The contact position between the head and tape face may be adjusted by rotating the eccentric pin 198. Thus, the head can be given a constant pad pressure to ensure steady tape run. The head-supporting board 30 inserted into the annular groove 199 has its height defined by the condition in which the eccentric pin 198 is threadedly engaged with the fixed chassis 14. Therefore, the level at which the recording-reproduction head 27 or 28 is set above the head-supporting board 30 can be adjusted by the annular groove 199 of the eccentric pin 198. Also the vertical shaking of the head-supporting board 30 itself can be prevented because the thrust or upward pressing force on the head-supporting board 30 is arrested by the annular groove 199. Since the eccentric pin 198 serves also as a thrust bearing, desired location and vertical shaking prevention can be achieved with a minimal number of parts and simple construction. Another eccentric pin 197 is obviously shaped like the eccentric pin 198.

As apparent from FIG. 8, the head-supporting board 30 comprises an integrally formed 2-pronged protuberance 200 engageable with the pin 139 erected on the cam board 32, and lever-like projections 202, 203 formed on both sides of the rotation center of the head-supporting board 30. These lever-like projections 202, 203 act as actuating levers for actuating the head circuit changeover switch 48 or motor polarity changeover switch 50.

Figure 12:
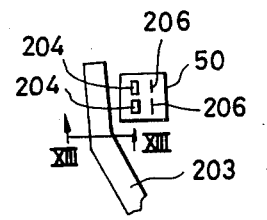
FIG. 12 is a top plan view showing the mechanical relationship of the head-supporting board and a motor polarity changeover switch.
Figure 13:
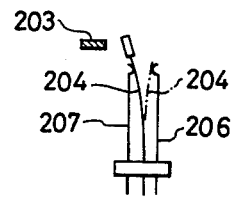
FIG. 13 is a sectional view on line XIII—XIII of FIG. 12.

There will now be described the motor polarity changeover switch 50 by reference to FIGS. 12 and 13. This motor polarity changeover switch 50 comprises one set of a single movable contact 204 and paired fixed contacts 206, 207 and another set of a single movable contact 204 and paired fixed contacts 206, 207. When the recording-reproduction head 27, for example, is pushed, the movable contact 204 having an elasticity of its own has a property of touching one fixed contact 206 but not the lever-like projection 203. Where the head-supporting board 30 is rotated clockwise of FIG. 8 to push the other recording-reproduction head 28, then the movable contact 204 is forcefully moved to touch the other fixed contact 207 by means of the lever-like projection 203. The head circuit changeover switch 48 has the same property and is operated in the same manner as the motor polarity changeover switch 50. In the foregoing embodiment, the head circuit changeover switch 48, motor polarity changeover switch 50 and tape run direction-instructing switch 52 were separately arranged. However, it is possible to provide a single switch designed concurrently to changeover the head circuit and motor polarity and also instruct the tape run direction.

Figure 14A:
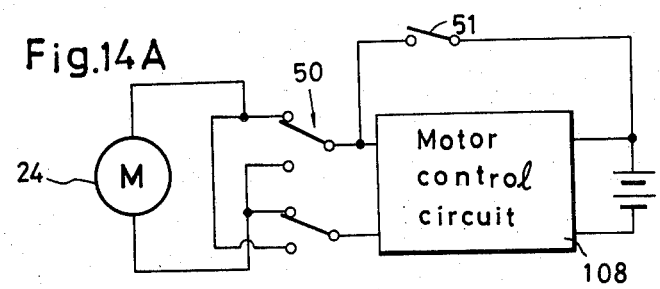
FIGS. 14A to 14D are block diagrams indicating the action of the motor polarity changeover switch.
Figure 14B:
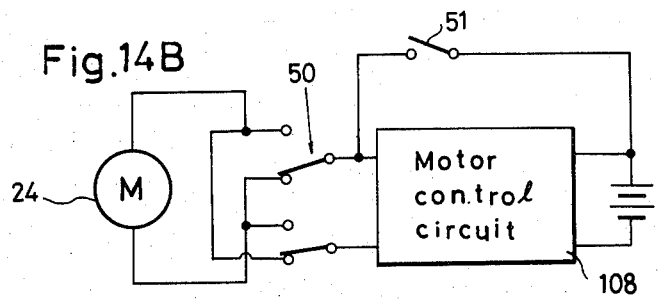
Figure 14C:
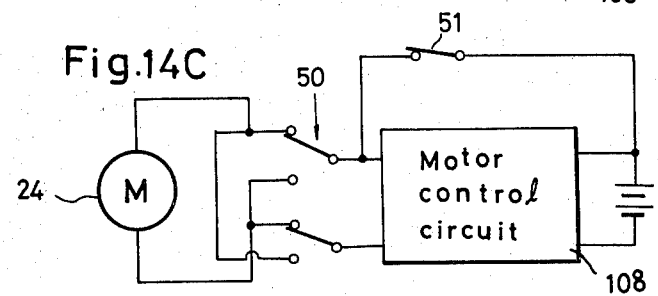
Figure 14D:
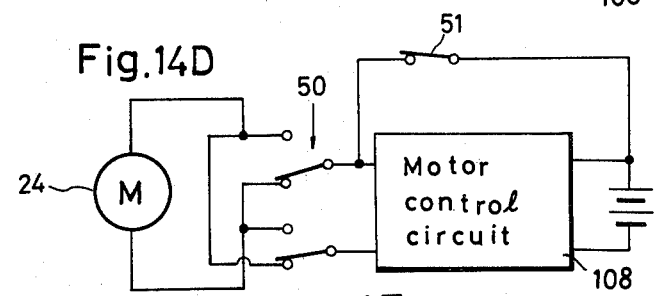
Figure 14E:
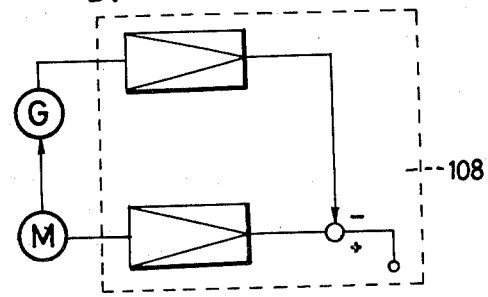
FIG. 14E is a schematic servo circuit for the motor polarity changeover switch.

As illustrated in FIGS. 14A to 14D, the electric circuit of the motor polarity changeover switch 50 can drive a motor in the normal or reverse direction by means of a motor control circuit 108. The constant rotation speed of a motor for both forward and reverse reproductions can be effected by making a comparison between a value obtained by detecting the actual number of rotations of the motor and a control target value designed to set the motor rotation at the prescribed speed and carrying out such control (namely, servo control) as minimizes a possible difference resulting from the comparison. A servo circuit used for this particular purpose may be formed of the known type shown in FIG. 14E. For the above-mentioned object, the switch 51 is released as shown in FIGS. 14A, 14B to apply servo control, thereby effecting the forward and reverse rotations with the rotation speed of a motor always rendered constant. The acceleration of the rotation speed of a motor for the FF and REW modes of a tape run is carried out by setting a control value at a higher level than a maximum number of rotations of a motor, and releasing the servo control to let the motor run at a maximum speed. To this end, the switch 51 is closed as shown in FIGS. 14C and 14D to effect the FF and REW modes of a tape run. As mentioned above, the servo control is applied or stopped by the changeover of the operation of the switch 51, and the operation of the motor polarity changeover switch 50 is shifted, thereby making it possible to effect the forward and reverse reproductions, and the FF and REW modes of a tape run simply by driving a single motor. Therefore, the object of letting the single motor run at a constant speed and controlling its high speed normal and reverse rotations is attained by a simple arrangement. An automatic reverse tape recorder embodying this invention which is free from a complicated mechanical arrangement can be operated with high reliability and manufactured at low cost. Where the motor is to be driven in the reverse direction, it is preferred that the motor be started a prescribed length of time after the end of its normal run in order to prevent its possible damage occurring at the start of its reverse rotation.

As shown in FIG. 6, a tape FF lever 42 is rotatably fitted by means of a snap ring to a rotatable pin 210 mounted on the fixed chassis 14. This tape FF lever 42 is provided at one end with a pin 122 engageable with a notch 123 formed in the pinch roller-supporting board 40. The tape FF lever 42 comprises an attachment 212 which is bent vertically downward (toward the backside of the drawing) and formed at the outer end of the tape FF lever 42, triangular hole 214 and elongated groove 216. The lever attachment 212 projects out of a case 218 in which the fixed chassis 14 and movable chassis 16 are received. Disposed in the triangular hole 214 is a pin 224 erected at the free end of a coupling board 222 movably fitted to the fixed chassis 14 by means of a rotatable pin 220. One end of a torsion coil spring 226 wound about the rotatable pin 220 is pressed against the pin 224 so erected as to project out of the triangular hole 214. The pin 220 is urged toward the apex 227 of the triangular hole 214, thereby ensuring the neutral position of the tape FF lever 42. Where the lever attachment 212 is rotated in the direction of A indicated in FIG. 6, then the pin 224 is pressed against the corner 229 of the triangular hole 214. Where the lever attachment 212 is rotated in the direction of B indicated in FIG. 6, then the pin 224 abuts against the corner 228 of the triangular hole 214. A movable contact 232 of a motor fast drive switch 230 is fitted into the elongated groove 216. While remaining in a neutral position as shown in FIG. 6, the movable contact 232 touches neither of the fixed contacts 233, 234.

There will now be described the alternate push of the recording-reproduction heads 27, 28 by the rotation of the head-supporting board 30. Now let it be assumed that the recording-reproduction head 27 is pushed and a tape is running in the forward direction. Where, in this case, the run of the motor 24 is reversed either by the hand, if necessary, or automatically by the detection of a tape end, then the magnetism-sensitive element 100 detects changes in the waveform of pulses issued from the magnetic ring 68. As a result, the plunger 110 is moved inward for the prescribed distance against the urging force of the tension spring 131 by the joint action of the signal-processing circuit 102, logic circuit 104 and plunger drive circuit 106. Where the recording-reproduction head 27 is pushed, then the pin 130 of the coupling board 114 is urged as shown in FIG. 7, to the corner 133 of the heart-shaped cam groove 132. As a result, the junction 137 of the paired lobes 135, 136 is positioned below an imaginary line extending between the pin 130 and the rotation center 144 of the cam board 32. Where, therefore, the plunger 110 is moved inward, then the pin 130 of the coupling board 114 moving with the plunger 110 is guided through the right lobe 135 of the heart-shaped cam groove 132 to press the end wall of the right lobe 135, thereby causing the cam board 32 to be rotated counterclockwise about the rotation center 144. Where the cam board 32 is rotated counterclockwise, the movable contact 149 is pressed against the other fixed contact 151 by means of the 2-pronged projection 148. As a result, a display lamp instructing the reverse run (right to left run) of a tape is lighted.

With the counterclockwise rotation of the cam board 32, the pin 139 of the cam board 32 is engaged with the 2-pronged projection 200. As a result, the head-supporting board 30 is rotated clockwise about the rotation center 196 (FIG. 8), until the board 30 touches the eccentric pin 197, thereby causing the recording-reproduction head 28 to be pushed. This eccentric pin 197 is constructed in the same manner as the eccentric pin 198 and can adjust the pushed position of the recording-reproduction head 28 and the level at which the head 28 is to be fitted. As apparent from FIG. 8, where the head-supporting board 30 is rotated clockwise, the lever-like projections 202, 203, respectively press the movable contacts of the head circuit changeover switch 48 and motor polarity changeover switch 50, causing the movable contacts to abut against the other fixed contact against their elastic force. The changeover of the operation of the switches 48, 50 establishes a head circuit for the recording-reproduction head 28 and reverses the polarity of the motor 24.

Figure 15:
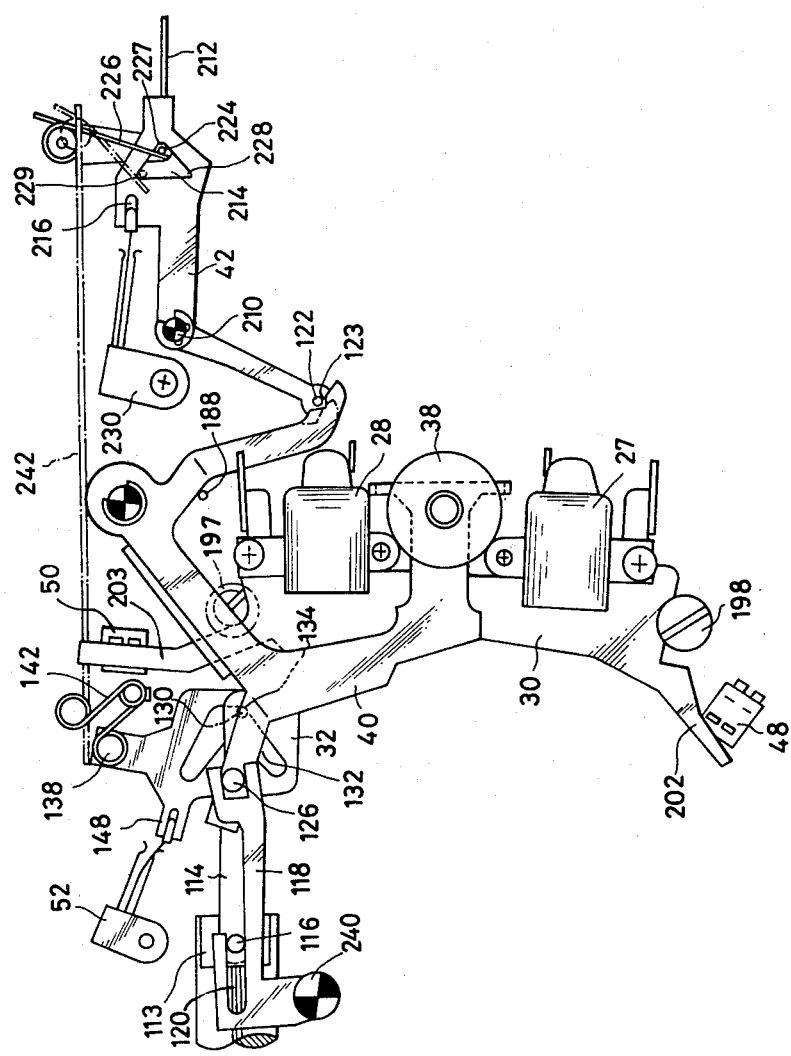
FIG. 15 is a top plan view showing the mechanical relationship of the plunger, cam board, pinch roller-supporting board, tape FF lever and head-supporting board.

After the recording-reproduction head 28 is pushed, the pin 130 of the coupling board 114 is urged, as shown in FIG. 15, by the force of the tension spring 131 (FIG. 7) to be pressed against the lower corner 134 of the heart-shaped cam groove 132. The coupling board 114 and plunger 110 are brought back to a projecting position by the urging force of the tension spring 131. At this time, the V-shaped junction 137 of the lobes 135, 136 of the heart-shaped cam groove 132 is set below an imaginary line extending between the erected pin 130 and the rotation center 144 of the cam board 32. Where, therefore, the plunger 110 is moved inward against the urging force of the tension spring 131, then the pin 130 is guided through the left lobe 136 of the heart-shaped cam groove 132 to press the end wall of the lobe 136. Accordingly, the cam board 32 is rotated clockwise, and the head-supporting board 30 is rotated counterclockwise, until said board 30 abuts against the eccentric pin 198. Therefore, the recording-reproduction head 27 shown in FIG. 8 is again brought to a projecting state. At this time the coupling board 114 occupies the position indicated in FIG. 7.

Figure 16:
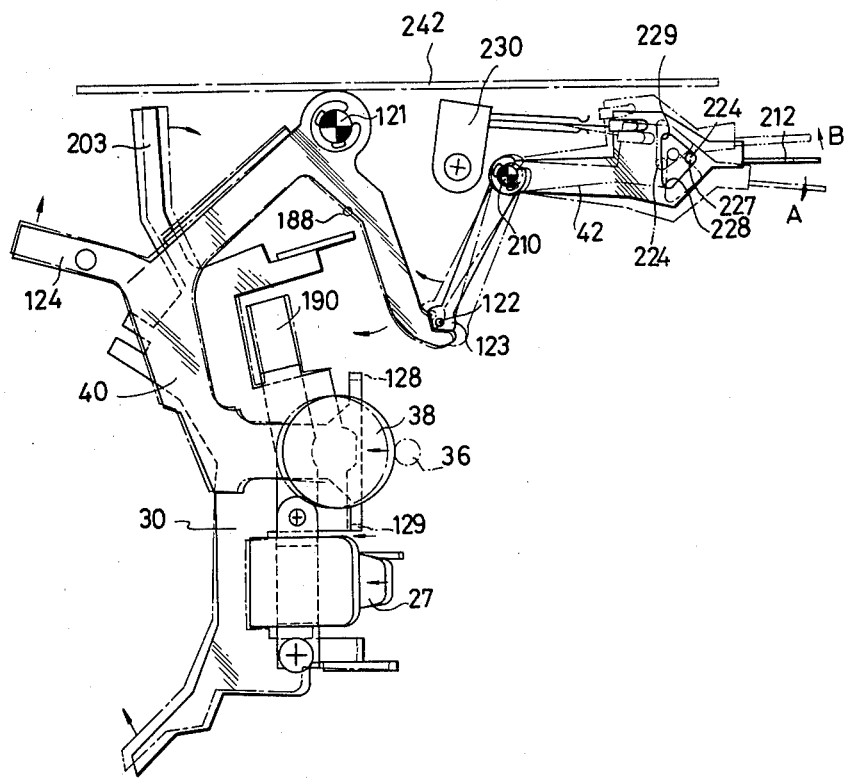
FIG. 16 is a top plan view showing the positions of the pinch roller-supporting board and head-supporting board when the tape FF lever is actuated.

The fast forwarding of a tape during its forward and reverse runs is effected by the rotation of the tape FF lever about the rotation center 210 (FIG. 6). Referring to FIG. 6, the REW operation during the forward run of a tape is carried out by rotating the lever attachment 212 in the direction A. Where the lever attachment 212 is rotated in the direction of A or B, the pin 224 is shifted from the neutral position in which the pin 224 is pressed against the wall of the apex 227 of the triangular hole 214 to the tape FF position in which the pin 224 abuts against the corner 229 or 228 of the triangular hole 214. Where the lever attachment 212 is rotated, as shown in FIG. 16, in the direction A for the REW operation, then the pin 122 of the tape FF lever 42 is moved clockwise along the surface of the left side portion of the notch 123 while pressing the wall thereof. As a result, the pinch roller-supporting board 40 is rotated clockwise about the rotation center 121 (FIG. 6), causing the pinch roller 38 to be separated from the capstan 36. The downward bent attachment 128 or 129 of the end portion of the pinch roller-supporting board 40 to which the pinch roller 38 is fitted is always positioned very close to part of the head-supporting board 30 even when the recording-reproduction head 27 or 28 is in a pushed state. The downward bent attachments 128, 129 are set at a level the same as or lower than the head-supporting board 30. Referring to FIG. 16, therefore, in which the recording-reproduction head 27 is pushed, the retract of the pinch roller-supporting board 40 due to the rotation of the lever attachment 212 in the direction A causes the downward bent lever attachment 129 to abut against the head-supporting board 30. As a result, the board 30 is slightly rotated clockwise about the rotation center 196 (FIG. 8). At this time, the pushed recording-reproduction head 27 is slightly retracted. A tape which is not contacted by the retracted recording-reproduction head 27 can be fast forward smoothly. The tape FF lever 42, head-supporting board 30 and pinch roller-supporting board 40 occupy the positions indicated in one dot-dash lines in FIG. 16, after the tape FF lever 42 is rotated in the direction A. Under such condition, the pin 224 is pressed against the corner 229 of the triangular hole 214 (FIG. 15) by the urging force of the torsion coil spring 188. Where the tape FF lever 42 is rotated in the direction B of FIG. 15 showing the pushed recording-reproduction head 28, then the pin 122 is rotated counterclockwise along the surface of the right side portion of the notch 123, when pressing the wall of the notch 123. As a result, the head-supporting board 30 is slightly rotated counterclockwise about the rotation center 196 (FIG. 8) to retract the recording-reproduction head 28. While this case represents the REW operation, the pin 224 is pressed against the corner 228 of the triangular hole 214 (FIG. 6). At this time, the lever attachment 212 is rotated in the same direction as that in which a tape is fast forwarded. If, therefore, the recording-reproduction head 27 is pushed, the REW operation is carried out by rotating the lever attachment 212 in the direction A, and the tape FF operation is effected by rotating the lever attachment 212 in the direction B. Conversely where the recording-reproduction head 28 is pushed, then the tape FF operation is carried out by rotating the lever attachment 212 in the direction A, and the REW operation is realized by rotating the lever attachment 212 in the direction B.

When the plunger 110 is moved inward, the plunger pin 116 is guided through the elongated groove of the plunger arm 118 to press the wall of the end of the elongated groove, thereby causing the plunger arm 118 to rotate counterclockwise about the rotation center 240 (FIG. 6). When the 2-pronged free end of the plunger arm 118 is engaged with the pin 126 of the pinch roller-supporting board 40, then the pinch roller-supporting board 40 is rotated clockwise against the urging force of the torsion coil spring 188. The tape FF lever 42 is normally subject to the urging force of the torsion coil spring 226 (FIG. 15) for causing the pin 224 to be pressed against the wall of the apex 227 of the triangular hole 214, namely, urged toward the neutral position. When the pinch roller-supporting board 40 is rotated clockwise, then the pin 122 is disengaged from the notch 123. Therefore, the tape FF lever 42 is rotated with the clockwise the tape FF lever 42 is rotated with the clockwise rotation of the pinch roller-supporting board 40. As a result, the pin 224 is pressed against the wall of the apex 227 of the triangular hole 214 to occupy a neutral position. Thus, the tap FF mode is released, at the moment the polarity of the motor 24 is changed.

Figure 17:
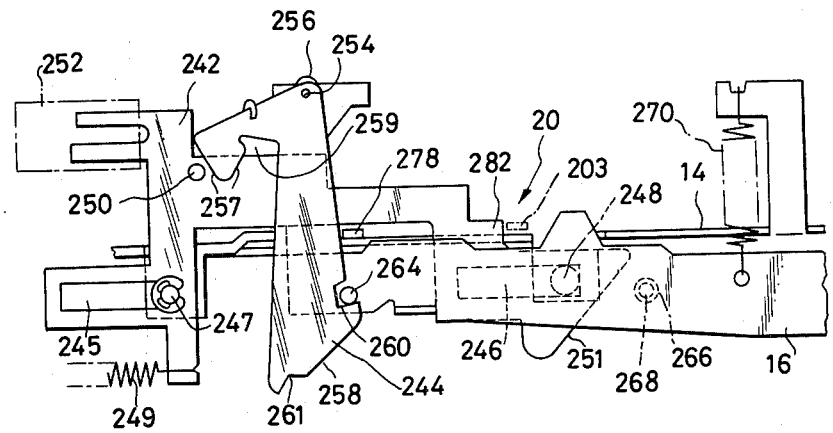
FIG. 17 is a right side view of a locking mechanism, before an engagement lever is pressed, showing that a movable chassis is in a rising position.
Figure 18:
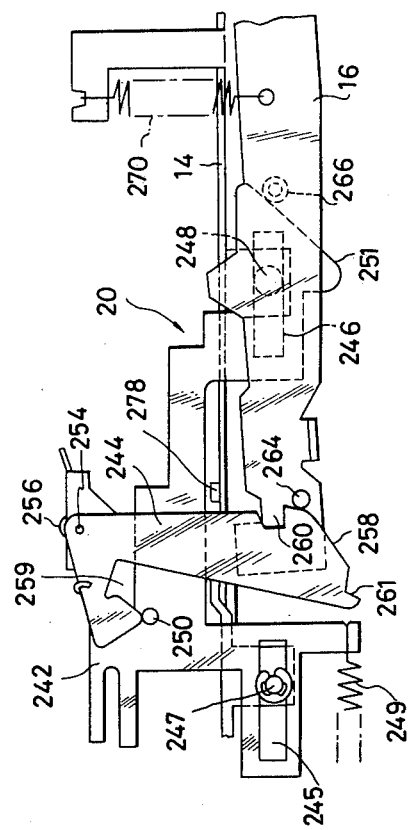
FIG. 18 is a right side view of the locking mechanism, while the engagement lever is pressed.
Figure 19:
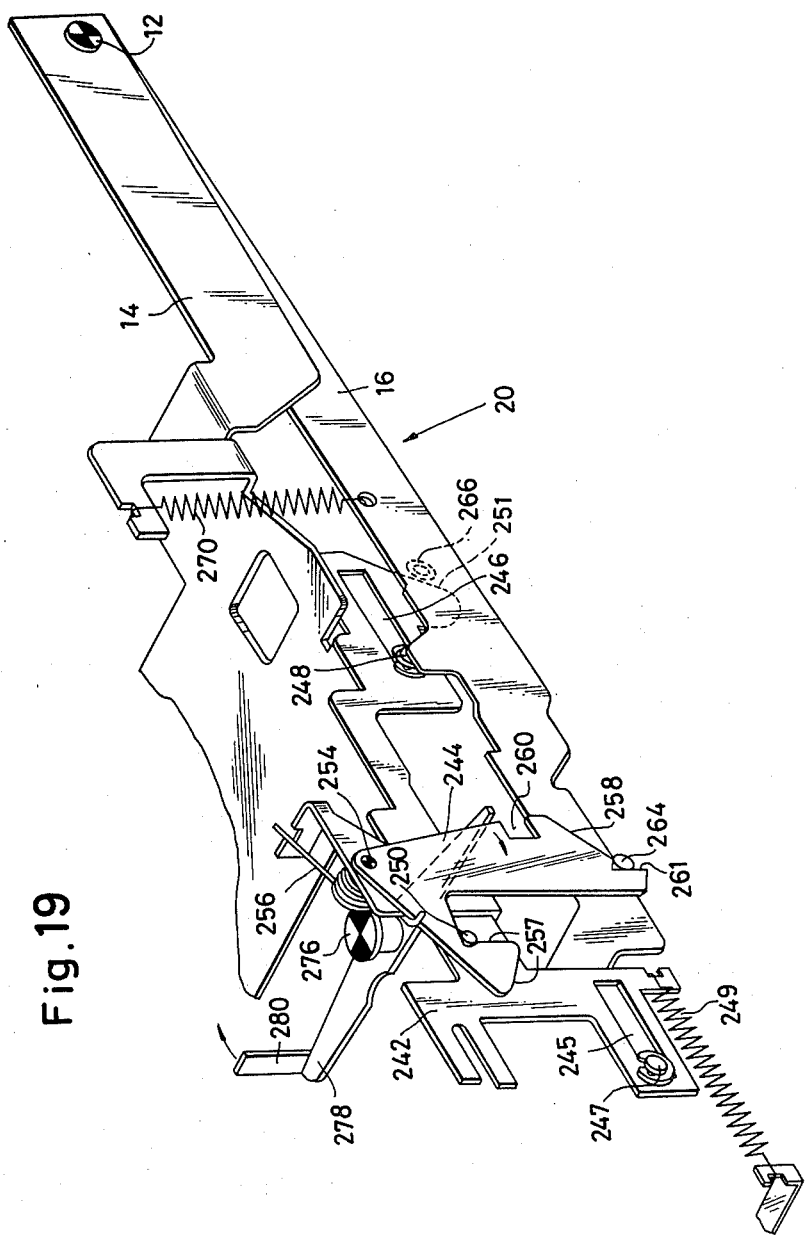
FIG. 19 is a perspective view of the locking mechanism, after the engagement lever is pressed, showing that the movable chassis is in a falling position.
Figure 20:
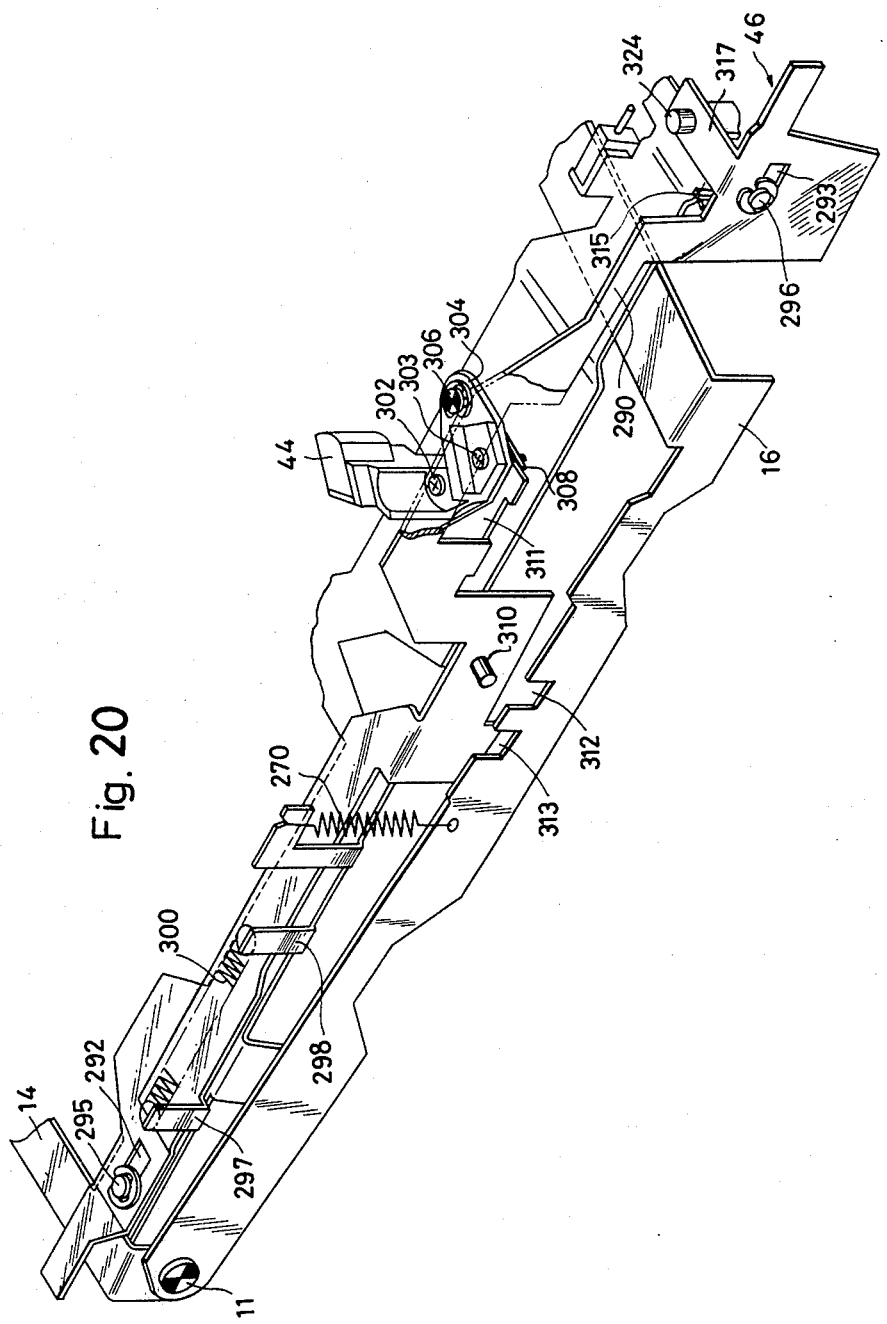
FIG. 20 is a perspective view of an erase head, before a push lever is pressed.

As shown in FIG. 17, the locking mechanism 20 of the movable chassis 16 comprises an engagement lever 242 reciprocably fitted to the fixed chassis 14 and engagement cam 244 rotatably fitted to the fixed chassis 14. The engagement lever 242 has a pair of crosswise extending elongated holes 245, 246. Guide pins 247, 248 fixed to a pair of attachments extending downward from the side walls of the fixed chassis 14 are detachably inserted into the elongated holes 245, 246 by means of the snap ring. The guide pins 247, 248 are pressed against the right side walls of the corresponding elongated holes 245, 246 by the urging force of a tension coil spring 249 stretched between the fixed chassis 14 and engagement lever 242. An engagement pin 250 is erected on the side wall of the engagement lever 242. The inner end of this engagement lever 242 constitutes a cam surface 251. Reference numeral 252 of FIG. 17 denotes a push button fitted to the outer end of the engagement lever 242. The engagement cam 244 is rotatably fitted to a bent attachment extending upward from the side wall of the fixed chassis 14 by means of a rotatable pin 254, and is urged counterclockwise of FIG. 17 by a torsion coil spring 256 wound about the rotatable pin 254. The engagement cam 244 comprises a pair of cam surfaces 257, 258 and three engagement grooves 259, 260, 261. An engagement pin 264 engageable with the engagement groove 260 of the engagement cam 244 when the movable chassis 16 is lifted is provided on one lateral side of the movable chassis 16 which faces the engagement cam 244. A movable guide roller 266 is mounted on the other lateral side of the movable chassis 16 which faces the engagement lever 242. The guide roller 266 is loosely fitted about the periphery of an erected pin 268. The movable chassis 16 is urged upward by a tension spring 270 stretched between the movable chassis 16 and a bent attachment extended upward from one lateral side of the fixed chassis 14. Another tension spring 270 is provided, as shown in FIG. 20, in a symmetric position on the other lateral side of the fixed chassis 14.

Where the push button 252 is pressed to bring down the movable chassis 16, then the engagement lever 242 is pressed against the urging force of the tension spring 249, while being guided by the guide pins 247, 248, until the left end walls of the elongated holes 245, 246, respectively abut against the guide pins 247, 248. During the initial stage of the stroke by which the engagement lever 242 is pressed, the engagement pin 250 of the engagement lever 242 slides along the periphery of the cam surface 257 of the engagement cam 244. As a result, the engagement cam 244 is rotated clockwise about the rotation center 254 against the urging force of a torsion spring 256. The clockwise rotation of the engagement cam 244 causes the engagement pin 264 of the movable chassis 16 to be disengaged from the engagement groove 260 of the engagement cam 244. At this time, the cam surface 251 of the engagement lever 242 is pressed against the guide roller 266 of the movable chassis 16, causing the movable chassis 16 to be rotated against the urging force of the tension spring 270 counterclockwise about the rotation center (FIG. 1), namely, to be pressed downward. Accordingly, the engagement pin 264 is brought to a position facing the cam surface 258 (FIG. 18). Where the stroke of pressing the engagement lever 242 further proceeds, the guide roller 266 is moved further downward along the cam surface 251 of the engagement lever 242 against the urging force of the tension spring 270. At this time, the engagement pin 264 of the movable chassis 16 is guided along the cam surface 258. Where the stroke of pressing the engagement lever 242 is brought to an end, then the engagement pin 264 is inserted into the engagement groove 261, thereby letting the tension spring 270 have a full urging force. As a result, the movable chassis 16 is brought to a fallen position as shown in FIG. 19. The stroke of pressing the engagement lever 242 is stopped when the guide pins 247, 248, respectively abut against the left end walls of the elongated holes 245, 246. At the end of the stroke, the engagement pin 250 is received in the engagement groove 259, causing the tension spring 249 to have a full urging force.

Where, in FIG. 19 showing the fallen movable chassis 16, a release lever 278 movably mounted on the fixed chassis 14 by means of a rotatable pin 276 is rotated by the insertion of a cassette, then the movable chassis 16 is lifted. In other words, when inserted, the cassette presses an upward bent attachment 280 (FIG. 19) formed at one end of the release lever 278. As a result, the release lever 278 is rotated clockwise about a rotation center 276. The tip of the other end portion of the release lever 278 is disposed fully apart from the rotation center 254 of the engagement cam 244, and one lateral side of the other end portion of the release lever 278 is set adjacent to the lateral side of the engagement cam 244. The upward bent attachment 280 itself is fully removed from the rotation center 276. Even where, therefore, the insertion of a cassette slightly presses the upward bent attachment 280, then a great rotation torque is applied to the engagement cam 244. Accordingly, when the upward bent attachment 280 of release lever 278 is pressed, however slightly, by the inserted cassette, the engagement cam 244 is immediately rotated clockwise of FIG. 19. As a result, the engagement pin 264 of the movable chassis 16 is released from the engagement groove 261. At this time, the engagement pin 264 slides along the cam surface 258 by the urging force of the tension spring 270 which has been accumulated by the stroke of pressing the engagement lever 242 to rotate the engagement cam 244 and then is inserted into another engagement groove 260. The movable chassis 16 is lifted with the movement of the engagement pin 264 and brought to rest when the engagement pin 264 is inserted into the engagement groove 260.

Like the tension spring 270, the tension spring 249 stretched between the engagement lever 242 and fixed chassis 14 has its urging force fully accumulated during the stroke by which the engagement lever 242 is pressed. Therefore, a force for clockwise rotating the engagement cam 244 is transmitted from the engagement pin 250 to the cam surface 257. When the engagement pin 264 is released from the engagement groove 261, the engagement cam 244 is rotated by an urging force transmitted from the tension spring 249 through the engagement pin 250, as well as by an urging force applied from the tension spring 270 to the engagement pin 264. As a result, the engagement pin 250 is brought back to a state disengaged from the engagement groove 259. The engagement lever 240 regains a projecting position by the fully accumulated urging force of the tension spring 249.

With the above-mentioned locking mechanism 20, the urging force of the tension spring 270 is accumulated by the stroke of pressing the engagement lever 242. The movable chassis 16 is lifted by the accumulated urging force of the tension spring 270. Therefore, the pressing force applied by the insertion of a cassette well serves the purpose, even if it is small. Therefore, it is unnecessary to apply a great force to a cassette when it is inserted. When, therefore a mechanically weak cassette such as a microcassette is fitted into a recording-reproduction apparatus, the movable chassis 16 can be lifted without the damage or destruction of such cassette. Further, two engagement grooves 260, 261 are formed in a single engagement cam 244. The movable chassis 16 is lifted or lowered by the different modes of engagement between the engagement pin 264 between the engagement grooves 260, 261. This arrangement renders the construction of the locking mechanism 20 simplified and compact, and provides a shockproof engagement. The movable chassis 16 is lifted by engagement between the engagement groove 260 and engagement pin 264. If, therefore, the tension spring 270 used has a small tension constant, it is obviously possible to let the spring 270 have a fully accumulated urging force when the movable chassis 16 is to be brought down.

While the recording-reproduction head 27 is pushed, as shown in FIG. 16, the lever-like projection 203 of the head-supporting board 30 is not disposed above the engagement lever 242. When pressed, therefore, by a stroke, the engagement lever 242 does not abut against the lever-like projection 203. In contrast, where the head-supporting board 30 is rotated clockwise to cause the recording-reproduction head 28 to be pushed, then the lever-like projection 203 protrudes beyond the engagement lever 242, as shown in FIG. 15. In this case, the projection 203 is positioned adjacent to the forward wall of the stepped portion 282 of the engagement lever 242 (FIG. 17). Where, therefore, the engagement lever 242 is pressed to eject a cassette with the recording-reproduction head 28 kept in a pushed state, then the stepped portion 282 of the engagement lever 242 presses the lever-like projection 203 to rotate the head-supporting board 30 counterclockwise, thereby pushing the other recording-reproduction head 27. If the recording-reproduction head 27 is pushed, as described above, when the engagement lever 242 is pressed to eject a cassette, when the head 27 is left in situ. If the recording-reproduction head 28 is pushed when the engagement lever 242 is pressed, then the recording-reproduction head 27 is now pushed by the rotation of the head-supporting board 30. Therefore, the recording-reproduction head 27 never fails to be pushed after a cassette is ejected. Where the cassette is again inserted into a tape recorder 10 in case of need, recording and reproduction can always be carried out by the head 27.

As shown in FIGS. 1 and 20, the tape recorder 10 comprises an erase head operation changeover mechanism 46 which pushes the erase head 44 at the time of recording and retracts it at the time of reproduction. The tape recorder 10 is used as part of, for example, a car stereophonic system. The erase head operation changeover mechanism 46 is provided with an erase head operation changeover push lever 290 for actuating an amplifier switch (not shown). As seen from FIG. 20, the push lever 290 has an elongated hole 292 formed in the upper surface and another elongated hole 293 provided on the lateral side. The pins 295, 296 of the fixed chassis 14 are loosely fitted into the elongated holes 292, 293 by means of a snap ring. A tension coil spring 300 is stretched between an upward bent attachment 297 provided on the lateral side of the push lever 290 and an upward bent attachment 298 formed on the lateral side of the fixed chassis 14. The pins 295, 296 are respectively pressed against the left side walls of the elongated holes 292, 293 by the urging force of the tension coil spring 300. The erase head 44 is mounted on a head-fitting board 304 by means of two screws 302, 303. The head-fitting board 304 is rotatably mounted on the fixed chassis 14 by means of a rotatable pin 306. One end of a torsion coil spring 308 wound about the pin 306 is pressed against the screw 303, causing the head-fitting board 304 to be urged clockwise. The screw 303 is pressed against a bent attachment 311 formed on the push lever 304. Since the tension coil spring 300 has a greater urging force than the torsion coil spring 308, the head-fitting board 304 is rotated counterclockwise, and the erase head 44 is retracted, as shown in FIG. 20, at the fall of the movable chassis 16. An engagement pin 310 is fitted to the lateral side of the push lever 290. Two notches 312, 313 are formed in the upper edge of the lateral side of the movable chassis 16 for engagement with the engagement pin 310. The notch 312 is formed at such a point as allows for the engagement of the engagement pin 310, when the movable chassis 16 is lifted without pressing the push lever 290. The other notch 313 is formed at such a point as allows for the engagement of the engagement pin 310, when the movable chassis 16 is lifted by pressing the push lever 290 against the urging force of the tension coil spring 300, until the pins 295, 296 are respectively pressed against the right end walls of the elongated holes 292, 293.

The push lever 290 has a projecting attachment 317 formed on the inner lateral wall. The projecting attachment 317 is fitted with the later described guide pin 324. An automatic reverse stop switch 315 fitted to a printed circuit board (not shown) is set inside of the projecting attachment 317. The automatic reverse stop switch 315 is a normally closed type provided in the plunger driving circuit 106, and is rendered nonconducting when the push lever 290 is pressed inward. The switch 315 has a movable contact disposed inside of the projecting attachment 317 of the push lever 290. When the push lever 290 is pressed, the projecting attachment 317 is pressed against the movable contact to release it from the fixed contact, thereby rendering the switch 315 nonconducting.

Figure 21:
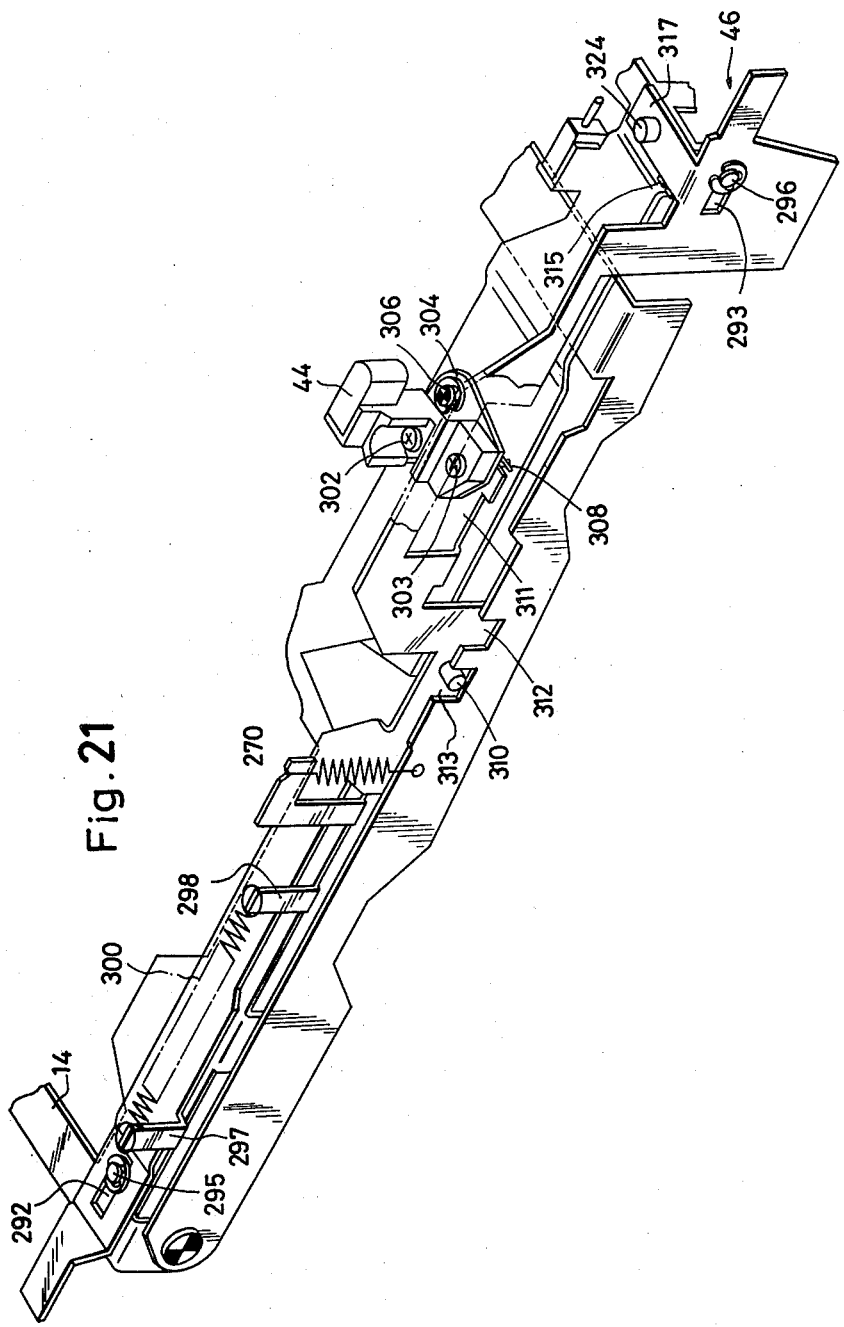
FIG. 21 is a perspective view of the erase head, when a recording mode has been arranged by pressing the push lever.

The engagement pin 310 and notches 312, 313 have the relative positions defined as described above. Where, therefore, a cassette is inserted into the tape recorder 10 without pressing the push lever 290 to release the locking mechanism 20 and the movable chassis 16 is lifted by the urging force of the tension spring 270, then the engagement pin 310 is inserted into the notch 312. Under this condition, the erase head-fitting board 304 is rotated counterclockwise by the urging force of the tension coil spring 300. The eraw head 44 which is retracted at this time does not abut against a tape. Therefore, it is possible to carry out only the reproduction mode, but not the recording mode. If, under this condition, an attempt is made to press the push lever 290 by mistake, the engagement pin 310 of the push lever 290 is inserted into the notch 312, thereby preventing the push lever 290 from being pressed. Consequently, the erasing of a tape which might otherwise occur by erroneous operation during reproduction can be completely prevented. As mentioned above, reproduction alone can be carried out under the normal condition. Recording can be effected only by pressing the push lever 290 to push the erase head 44 for contact with a tape. For the recording mode, the push lever 290 is pressed for the prescribed distance, that is, until the pins 295, 296 respectively abut against the right side walls of the elongated holes 292, 293 against the urging force of the tension coil spring 300. Where the movable chassis 16 is lifted by inserting a cassette in the tape recorder 10 with the push lever 290 pressed, then the engagement pin 310 is inserted into the notch 313 of the movable chassis 16. Where, at this time, the push lever 290 is pressed backward, then the bent attachment 311 is also retracted. As a result, the urging force of the torsion spring 308 is given a full play, causing the head-fitting board 304 to be rotated clockwise about the rotation center 306 (FIG. 21). Accordingly, the erase head 44 is set in the prescribed projecting position for contact with the surface of a tape, thereby effecting its erase. The angle through which the head-fitting board 304 is rotated clockwise to determine the prescribed projecting position of the erase head 44 is defined by a bent stopper 314 (FIG. 1) extending above the fixed chassis 14. This stopper 314 also acts a member against which the other end of the torsion spring 308 is pressed.

Where the push lever 290 is pressed for the recording mode, then the projecting attachment 317 of the push lever 290 is jointly moved inward to abut against the movable contact of the normally closed switch 315 to detach it from the fixed contact, thereby opening the plunger-driving circuit 106. When the plunger-driving circuit 106 is opened, then an automatic reverse tape run is made impossible, thereby preventing recording from being effected on the opposite plane of a tape.

Figure 22:
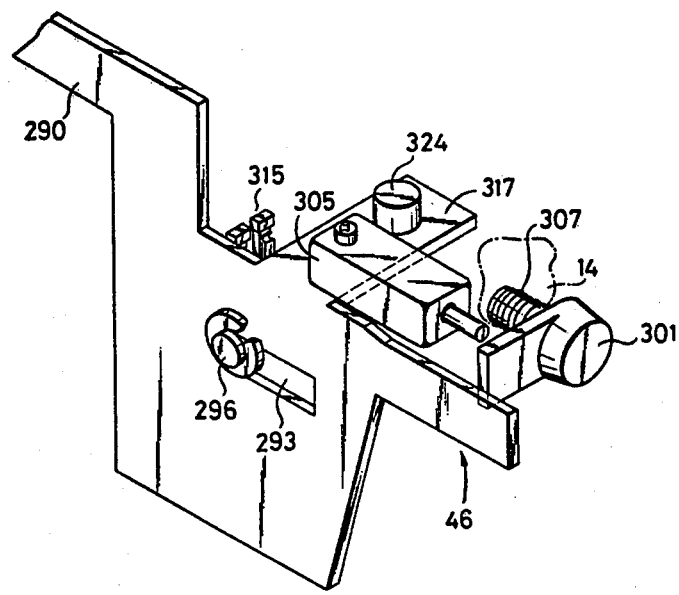
FIG. 22 is a fractional perspective view of the push lever in which a program switch is mounted.

Generally, a reliably accurate vertical level of a tape is ensured on the A plane of a cassette, whereas the level can not be realized on the B plane thereof. With the foregoing embodiment of this invention, forward recording is made possible only when a cassette is inserted into the tape recorder 10 with the A plane kept upward. At this time, recording can be effected with tones of good quality. It is considered necessary to stop the operation of a program switch during the recording mode. To this end, it is possible to fit, for example, a program switch 305 to the push lever 290 and attach the program button 301 to the fixed chassis 14 for abutment against the program switch 305 (FIG. 22). The push lever 290 projects outward during the reproduction mode and is pressed inward during the recording mode. The program button 301 is so mounted on the fixed chassis 14 as to abut against the program switch 305 set on the push lever 290 only during reproduction, by utilizing the above-mentioned arrangement of the push lever 290. The program switch 305 is the normally closed type. A compression spring 307 is wound about the shaft of the program button 301. The program switch 305 is so fitted to the push lever 290 as to be moved with the push lever 290 beyond the range of the depression stroke of the program button 301. The above-mentioned arrangement prevents the program button 301 from pressing the program switch 305 while the push lever 290 is pressed. Since, at this time, the program switch 305 is not actuated, the execution of a program (manual reverse operation) can be completely prevented during recording.

Since recording is undertaken only during the forward run of a tape, the head 28 may obviously be the type exclusively used for reproduction, instead of the concurrent type for both recording and reproduction.

Figure 23:
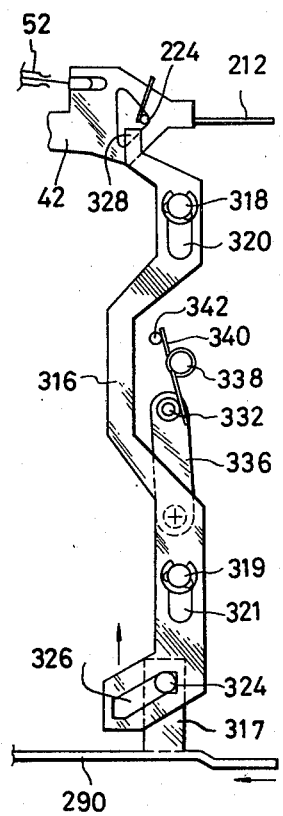
FIG. 23 is a top plan view of a stopper board, before the push lever is pressed.
Figure 24:
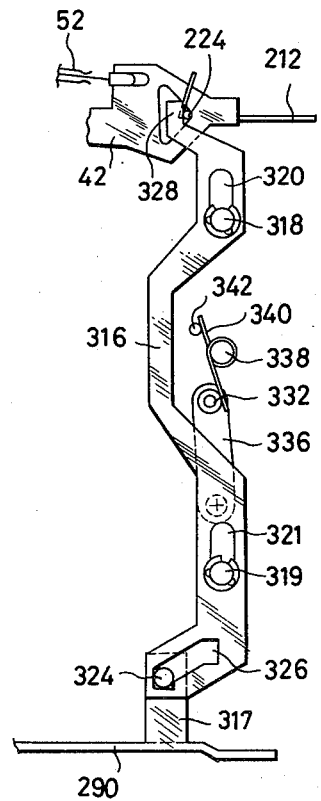
FIG. 24 is a top plan view of the stopper board, after the push lever is pressed.
Figure 25:
FIG. 25 is a fragmental side view of a cassette located by locating pins 332, 333 (not shown) and 334.

The fast forwarding of a tape is required during reproduction but is unnecessary during recording. Therefore, the stopper board 316 for preventing the rotation of a tape FF lever 42 during recording is mounted, as shown in FIG. 1, on the fixed chassis 14 close to the tape FF lever 42. As apparent from FIG. 23, the stopper board 316 comprises elongated holes 320, 321 into which the smaller diameter sections of the stepped pins 318, 319 mounted on the fixed chassis 14 are loosely fitted. The stopper board 316 is provided at one end with a cam groove 326 into which there is loosely inserted a guide pin 324 mounted on the push lever 290 for changing over the operation of the erase head. The other end of the stopper board 316 constitutes a stopper attachment 328 extending close to a pin 224 for defining the rotation of the tape FF lever 42. The stopper board 316 takes the position indicated in FIG. 23 during the reproduction mode in which the push lever 290 is not pressed, because the guide pin 324 and cam groove 326 of the stopper board 316 are engaged with each other. Under this condition, the stopper attachment 328 is removed from the pin 324. During the recording mode, however, in which the push lever 290 is pressed to push the erase head 44 for contact with a tape, then the stopper board 316 is moved upward of FIG. 23 to allow for the movement of the guide pin 324 resulting from the pressing of the push lever 290. In other words, as the guide pin 324 travels through the cam groove 326, the stopper board 316 undergoes an upward acting component of force, and occupies the position shown in FIG. 24 by being guided upward by the pins 318, 319. The distance through which the stopper board 316 is to be moved upward is determined in consideration of the shape of the cam groove 326 so as to allow the stopper attachment 328 to move vertically through a space lying ahead of the pin 224. When the push lever 290 is pressed, the attachment 328 of the stopper board 316 protrudes toward the pin 224 and is positioned on the rotation path of the pin 224. Where, therefore, an attempt is made to rotate a lever attachment 212 in any direction, the lever attachment 212 can not be rotated, because the pin 224 abuts against the stopper attachment 328. Consequently, it is possible to completely stop the fast forwarding of a tape which might otherwise occur by erroneous operation during the recording mode.

FIGS. 1 and 23 to 25, reference numeral 332 denotes a movable locating pin which sets a cassette exactly in the prescribed position in the tape recorder 10 with the aid of locating pins 333, 334. This movable locating pin 332 is fitted to a rotatable support board 336 above the fixed chassis 14, and is urged inward by a torsion coil spring 340 wound about the pin 338 mounted on the fixed chassis 14. Reference numeral 342 denotes a pin against which the other end of the torsion spring 340 abuts. When engaged with the guide hole of a cassette, the movable locating pin 332 presses the cassette inward and is shaped like a double conical form in order to push the cassette further inward even after fully engaged with the guide hole of the cassette. The locating pins 333, 334 mounted on the fixed chassis 14 are similarly shaped like a double conical form.

Figure 26:
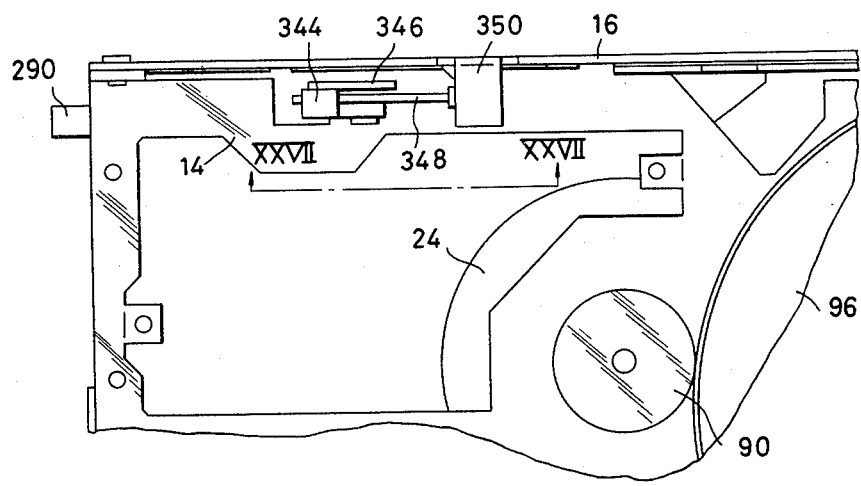
FIG. 26 is a bottom plan view showing the mechanical relationship of a main switch of an electric circuit and the movable chassis.
Figure 27:
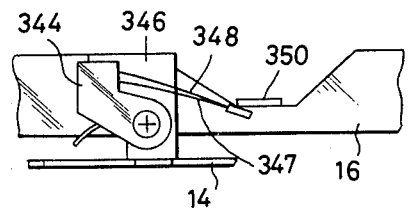
FIG. 27 is a side view on line XXVII—XXVII of FIG. 26.

A main switch 344 for supplying power to a print circuit formed on a printed circuit board (not shown) mounted on the fixed chassis 14 is fitted, as shown in FIGS. 26 and 27, to the lateral wall of a bent attachment 346 extending downward from the fixed chassis 14 (extending upward as indicated). The main switch 344 comprises a fixed contact 347 and movable contact 348. The movable contact 348 has a property to be removed from the fixed contact 347 under the normal condition. The movable chassis 16 has an inward extending bent attachment 350. At the fall of the movable chassis 16, the movable contact 348 does not touch the bent attachment 350, but is removed from the fixed contact 347 due to its intrinsic property. At the rise of the movable chassis 16, the movable contact 348 is so moved as to abut against the fixed contact 347 by means of the bent attachment 350. When, therefore, the movable chassis 16 is lifted by the insertion of a cassette into the tape recorder 10, then an electric circuit is established on the printed circuit board. As a result, a motor is driven to let a tape run in the forward direction.

Figure 28:
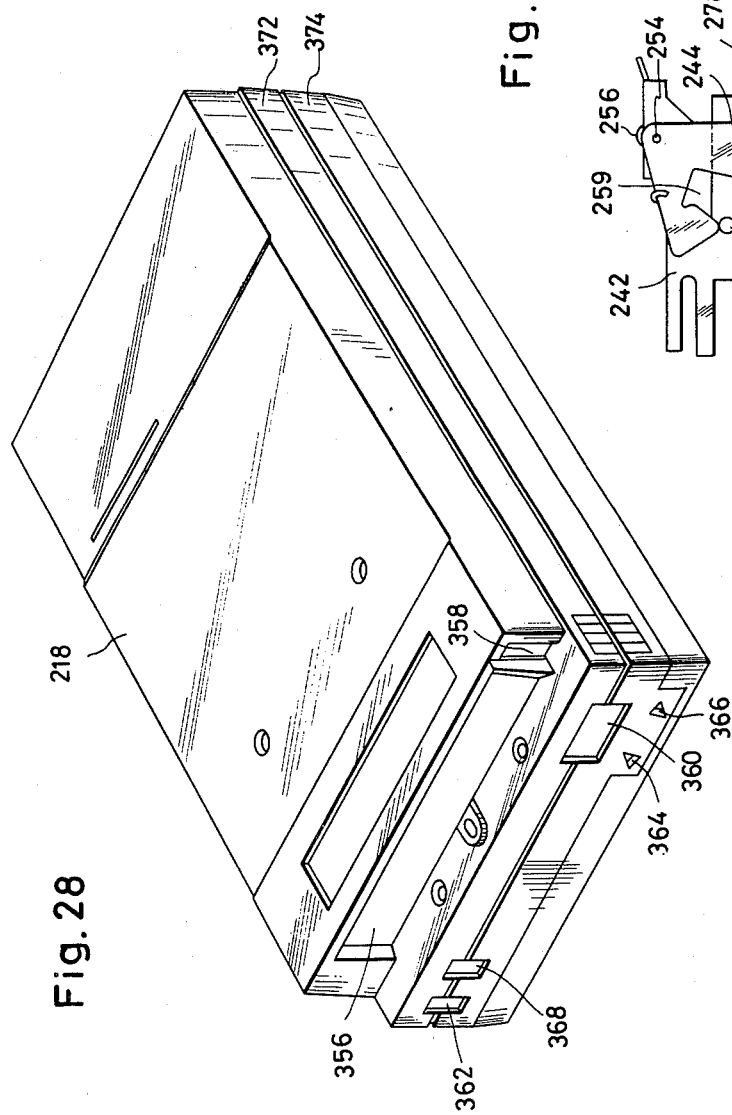
FIG. 28 is a perspective view of a tape recorder case.

FIG. 28 shows a case 218 for receiving the fixed chassis 14, movable chassis 16 and other members. A cassette is inserted into the tape recorder 10 through an inlet 356. A large number of openings are formed in the front wall of the case 218. Reference numerals 358, 360, 362 denote openings for the push button 252 of the engagement lever 242, the lever attachment 212 of the tape FF lever 42 and the push button of the push lever 290. Triangular windows 364, 366 show the display windows of the lamps indicating the directions in which a tape is run at the current time. Reference numeral 368 indicates an opening for the program button 301 for the program switch 305 used to reverse the rotation of the motor 24 as often as required, instead of at the moment when a tape end is detected.

Figure 29:
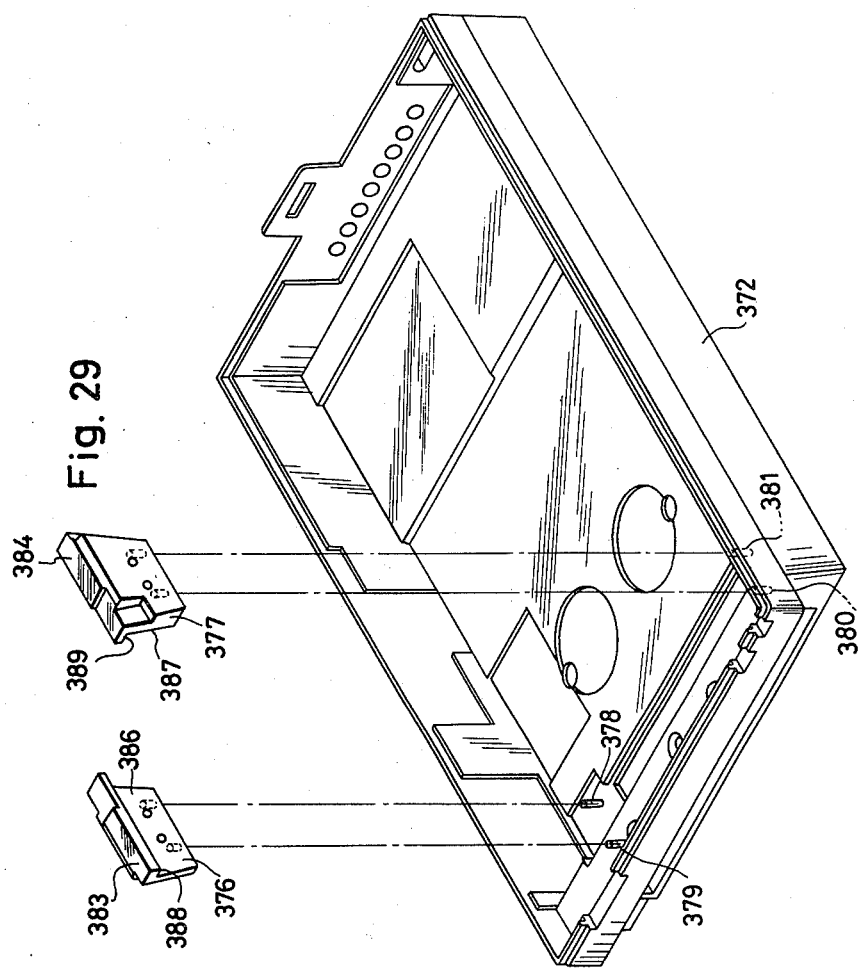
FIG. 29 is a perspective view of an upper half case showing the inside thereof.

The case 218 is formed of a pair of halfcases 372, 374. The upper halfcase 372 comprises, as shown in FIG. 29, a pair of guide attachments 376, 377 for guiding a cassette when inserted into the tape recorder 10. Each of the guide attachments 376, 377 has a pair of engagement holes. Pins 378, 379 erected on the upper halfcase 372 are fitted in the paired engagement holes of the guide attachment 376. Pins 380, 381 erected on the upper halfcase 372 are fitted into the paired engagement holes of the guide attachment 377. The guide attachments 376, 377 are fixed to the upper halfcase 372 by means of the pins 378 to 381. As seen from FIG. 29, the guide attachment 376 has a crosswise bent member 383, and the guide attachment 377 has a crosswise bent member 384. The lateral position of a cassette is guided by the joint action of the lateral wall 386 of the guide attachment 376 and the end wall 387 of the guide attachment 377. The lower position of the cassette is guided by the upper surface 388 of the bent member 383 of the guide attachment 376 and the upper surface 389 of the bent member 384 of the guide attachment 377 (the surfaces are directed downwards as indicated). The upper position of the cassette is guided by the urging force of a torsion coil spring of a hinged inlet cover (not shown) rotated upward by the insertion of the cassette, the urging force being applied to the cassette from above. The guide attachments 376, 377 and inlet cover can guide the cassette substantially to the prescribed position, though the guiding may be carried out roughly. The accurate location of the cassette is effected by the double conical fixed locating pins 333, 334 and movable locating pin 332. The above-mentioned rough guide of the cassette by the guide attachments 376, 377 and inlet cover is carried out without using the members mounted on the fixed chassis 14, whereby ensuring the desired guide of the cassette by a small number of parts without complicating the construction of the tape recorder 10 itself.

FIG. 30 is a block diagram showing the operation of an FF switch and program switch. Where the FF switch is actuated, a head signal generated in the logic circuit 104 is cut off, causing the motor 24 to be fast driven in the forward direction. Where the program switch 305 in operated, then a head signal produced in the logic circuit 104 is cut off, causing the motor 24 to be fast rotated in the opposite direction. Where the program switch 305 is released, then the plunger is again put into operation to start the normal rotation of the motor 24.

Figure 31:
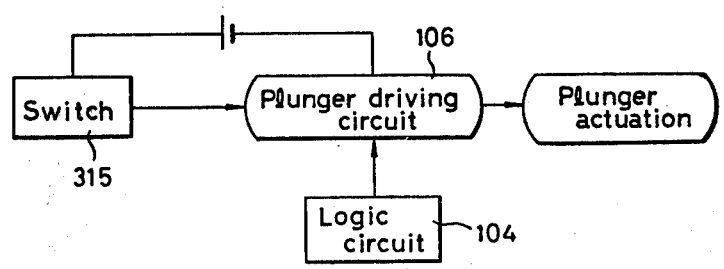
FIG. 31 is a block diagram showing the operation of an automatic reverse prevention switch.

FIG. 31 is a block circuit diagram of the automatic reverse stop switch 315 for stopping the automatic reverse operation during recording.

Thus, according to this invention, a capstan shaft is disposed in the center, and 4-track 2-channel magnetic heads are arranged on a single rotatable head-supporting board in positions at equal distances from the rotation center of the head-supporting board. At time of tape end detection or programming (manual reverse), the head-supporting board is rotated to extrude and retract the heads on the upper- and lower-course sides of the center capstan, respectively, so that only the upper-course-side head may be brought into contact with a tape face. Naturally, in such construction, there is no need of 4-channel heads, and stable tape run can be obtained because the upper-course-side head is always in contact with the tape face in both forward and reverse operations.

Moreover, the rotated position of the head-supporting board is determined by a pair of rotatable locating pins disposed respectively near both end portions of the head-supporting board and each having an annular groove in which the head-supporting board can be fitted. The locating pins are eccentric pins with eccentric annular grooves, which are screwed onto a fixed chassis and move in the vertical direction by their own rotation.

Accordingly, the head-supporting board is located in a position spaced from the rotation center by the engagement with the annular grooves on the eccentric pins, so that the position of the head-supporting board after rotating may be maintained with accuracy, and the contact surfaces of the head and tape face can be held in a determined position. The head-supporting board inserted into the annular groove has its height defined by the condition in which the eccentric pin is threadedly engaged with the fixed chassis. Therefore, the level at which the recording-reproduction head is set above the head-supporting board can be adjusted by the annular groove of the eccentric pin. Also the vertical shaking of the head-supporting board itself can be prevented because the thrust or upward pressing force on the head-supporting board is arrested by the annular groove. Since the locating pins serve also as thrust bearings, desired location and vertical shaking prevention can be achieved with a minimal number of parts and simple construction.

The rotation of the eccentric pin causes that plane of the eccentric pin which abuts against the head-supporting board to be widely displaced, though the eccentric pin itself remains unchanged in position. Accordingly, the horizontally pushed position of the recording-reproduction head can be reliably adjusted over a board range without increasing a free space occupied by the eccentric pin. By the rotation of the eccentric pins, moreover, the contact position between the head and tape face may be adjusted, and thus the head can be given a constant pad pressure to ensure steady tape run.

What is claimed is:

1. An automatic reverse cassette tape recorder comprising a pair of reel shafts for a supply reel and a takeup reel, a capstan shaft and a rotatable magnetic head-supporting board having a forward magnetic head and a reverse magnetic head mounted thereon, both heads being of the 4-track, 2-channel type, means for pivoting the board about a pivot point, said pivot point and said capstan shaft being located on a straight line perpendicular to and bisecting a straight line joining said reel shafts and being located on opposite sides respectively of said straight line joining said reel shafts, said magnetic heads being located at substantially equal distance from said pivot point, means for detecting the end of a tape, and means responsive thereto for rotating said head-supporting board when a tape end is detected, whereby the supply reel side of said capstan is brought into contact with a tape face.

2. An automatic-reverse cassette tape recorder according to claim 1 further comprising a locating means including a pair of rotatable locating pins, each said pin having an annular groove cooperating with said head-supporting board and each disposed respectively adjacent an end portion of said head-supporting board and rotatable to move up and down.

3. An automatic reverse cassette tape recorder according to claim 2, wherein each said locating pin of said locating means is an eccentric pin the center line of the annular groove being displaced from that of the locating pin.

4. An automatic reverse cassette tape recorder according to claim 2 or 3, wherein said locating pins of said locating means are screwed onto a fixed chassis on which said head-supporting board is mounted.

5. An automatic reverse cassette tape recorder according to claim 1 further comprising automatic reverse preventing means interlocking with means for setting a recording mode, whereby automatic reverse operation in the recording mode is prohibited, and wherein said forward head can perform both reproduction and recording operations, and said reverse head can perform at least recording operations.

6. An automatic reverse cassette tape recorder according to claim 5 further comprising a motor polarity changeover switch operated by said head-supporting board when said head-supporting board is rotated, tape end detector means to detect the tape end, and head-supporting board rotating means to rotate said head-supporting board when the tape end is detected by said tape end detector means.

7. An automatic reverse cassette tape recorder according to claim 6, wherein said automatic reverse preventing means includes a normally closed switch disposed in an electric circuit of said head-supporting board rotating means, said normally closed switch being touched and turned off by said operation member for the setting of the recording mode when said operation member is operated so as to open the electric circuit of said head-supporting board rotating means.

8. An automatic reverse cassette tape recorder according to claim 7, wherein said tape end detector means includes a magnetic ring having alternately formed N and S poles and rotating together with a pair of reel shafts, and a magnetism-sensitive element adjacent to said magnetic ring sensing waveform changes of pulses generated by said magnetic ring to produce electric signals, thereby rotating said head-supporting board rotating means.

9. An automatic reverse cassette tape recorder according to claim 8, wherein said head-supporting board rotating means includes a plunger mechanism coupled to said head-supporting board and having a plunger to reciprocate in accordance with the electric signals from said magnetism-sensitive element, and said normally closed switch is disposed in a plunger driving circuit of said plunger mechanism.

10. An automatic reverse cassette tape recorder according to claim 9, wherein said head-supporting board rotating means further includes a rotatable cam board coupled to the plunger of said plunger mechanism and said head-supporting board, whereby the reciprocation of said plunger is converted into a rotating motion of said head-supporting board.

11. An automatic reverse cassette tape recorder according to claim 10, wherein said cam board has a heart-shaped cam groove including a coupled pair of lobes jointly defining a V-shaped junction and a pair of corners, and is subjected to a biasing force of a torsion spring to function as a toggle spring, and said plunger and cam board are coupled with each other by means of a coupling plate having one end rotatably connected to said plunger and a pin on the other end biased to one of said corners by a biasing force in a direction to leave said plunger so that one end portion of said cam board is coupled with one end portion of said head-supporting board.

12. An automatic reverse cassette tape recorder according to any one of claims 5 to 11 further comprising a program switch for reversing a motor as required.

13. An automatic reverse cassette tape recorder according to claim 12 further comprising a program button abutting said program switch to operate the same and the program switch is so connected to the operation member as to be moved with the operation member beyond the range of the depression stroke of the program switch.

* * * * *